(12) United States Patent
Otterness et al.

(10) Patent No.: US 6,460,122 B1
(45) Date of Patent: Oct. 1, 2002

(54) SYSTEM, APPARATUS AND METHOD FOR MULTI-LEVEL CACHE IN A MULTI-PROCESSOR/MULTI-CONTROLLER ENVIRONMENT

(75) Inventors: Noel S. Otterness; William A. Brant, both of Boulder; Keith E. Short, Lafayette; Joseph G. Skazinski, Bertoud, all of CO (US)

(73) Assignee: International Business Machine Corporation, Armonk, NY (US)

( * ) Notice: Subject to any disclaimer, the term of this patent is extended or adjusted under 35 U.S.C. 154(b) by 0 days.

(21) Appl. No.: 09/409,929

(22) Filed: Sep. 30, 1999

Related U.S. Application Data

(60) Provisional application No. 60/127,231, filed on Mar. 31, 1999.

(51) Int. Cl.$^7$ .............................................. G06F 12/00
(52) U.S. Cl. ...................... 711/154; 711/122; 711/130; 711/216
(58) Field of Search ................................. 711/114, 113, 711/122, 139, 154, 216, 136, 141

(56) References Cited

U.S. PATENT DOCUMENTS

| | | | | |
|---|---|---|---|---|
| 5,251,310 A | | 10/1993 | Smelser et al. ............. | 395/425 |
| 5,287,499 A | * | 2/1994 | Nemes ........................ | 707/2 |
| 5,414,704 A | * | 5/1995 | Spinney ...................... | 370/389 |
| 5,475,826 A | * | 12/1995 | Fischer ........................ | 707/1 |
| 5,479,636 A | | 12/1995 | Vanka et al. ................ | 395/460 |
| 5,506,971 A | | 4/1996 | Gullette et al. ............. | 395/296 |
| 5,557,769 A | | 9/1996 | Bailey et al. ............... | 395/473 |
| 5,559,979 A | * | 9/1996 | Shiga et al. ................. | 711/216 |
| 5,561,783 A | | 10/1996 | Vanka et al. ................ | 395/468 |
| 5,594,862 A | * | 1/1997 | Winkler et al. ........ | 395/182.03 |
| 5,677,890 A | | 10/1997 | Liong et al. ................ | 365/229 |
| 5,701,432 A | * | 12/1997 | Wong et al. ................ | 395/457 |

(List continued on next page.)

OTHER PUBLICATIONS

Talluri et al., "A New Page Table for 64–bit Address Spaces," ACM, pp. 184–200, Dec. 1995.*

Primary Examiner—Matthew Kim
Assistant Examiner—Stephen Elmore
(74) Attorney, Agent, or Firm—Dorsey & Whitney LLP; R. Michael Ananian

(57) ABSTRACT

This inventive provides a multiple level cache structure and multiple level caching method that distributes I/O processing loads including caching operations between processors to provide higher performance I/O processing, especially in a server environment. A method of achieving optimal data throughput by taking full advantage of multiple processing resources is disclosed. A method for managing the allocation of the data caches to optimize the host access time and parity generation is disclosed. A cache allocation for RAID stripes guaranteed to provide fast access times for the XOR engine by ensuring that all cache lines are allocated from the same cache level is disclosed. Allocation of cache lines for RAID levels which do not require parity generation and are allocated in such manner as to maximize utilization of the memory bandwidth is disclosed. Parity generation which is optimized for use of the processor least utilized at the time the cache lines are allocated, thereby providing for dynamic load balancing amongst the multiple processing resources, is disclosed. An inventive cache line descriptor for maintaining information about which cache data pool the cache line resides within, and an inventive cache line descriptor which includes enhancements to allow for movement of cache data from one cache level to another is disclosed. A cache line descriptor with enhancements for tracking the cache within which RAID stripe cache lines siblings reside is disclosed. System, apparatus, computer program product, and methods to support these aspects alone and in combination are also provided.

44 Claims, 13 Drawing Sheets

U.S. PATENT DOCUMENTS

| | | | | |
|---|---|---|---|---|
| 5,761,531 A | * | 6/1998 | Ohmura et al. | 395/841 |
| 5,781,733 A | | 7/1998 | Stiles | 395/200.45 |
| 5,790,828 A | * | 8/1998 | Jost | 711/113 |
| 5,802,561 A | | 9/1998 | Fava et al. | 711/120 |
| 6,009,498 A | * | 12/1999 | Kumasawa et al. | 711/113 |
| 6,081,883 A | * | 6/2000 | Popelka et al. | 712/28 |
| 6,112,255 A | * | 8/2000 | Dunn et al. | 710/7 |
| 6,161,165 A | * | 12/2000 | Solomon et al. | 711/114 |
| 6,237,046 B1 | * | 5/2001 | Ohmura et al. | 710/1 |
| 6,292,880 B1 | * | 9/2001 | Mattis et al. | 707/7 |

* cited by examiner

SYSTEM, APPARATUS AND METHOD FOR MULTI-LEVEL CACHE IN A MULTI-PROCESSOR/MULTI-CONTROLLER ENVIRONMENT

This application claims the benefit of provisional application 60/127,231 filed Mar. 31, 1999.

FIELD OF THE INVENTION

This invention pertains generally to an input/output processing structure and method for computer systems having a plurality of processing resources, and more particularly to a multiple level cache structure and multiple level caching method that distributes input/output processing loads including caching operations between the plurality of processors to provide higher performance input/output processing, especially in a server environment.

BACKGROUND OF THE INVENTION

In some conventional I/O processing systems, such as I/O processing systems made by Mylex Corporation of Fremont, Cali. (and Boulder, Colorado) a first processor is generally dedicated to running the application code, while a second processor is used as a dedicated XOR engine. The XOR processor (XOR engine) performs the exclusive-or ("XOR") calculation associated with parity computations.

In Redundant Array of Independent Disk (RAID) terminology, a RAID stripe is made up of all the cache lines which will be stored on the data disks plus the parity disk. A data stripe includes all of the cache lines which are stored on the data disks, minus the parity disk. To compute parity, all of the cache lines which make up a data stripe are XORed together. There are numerous alternative known XOR configurations and XOR processors or engines that accomplish this XOR operation. (See for example, "Error Control Systems For Digital Communication and Storage, Stephen B. Wicker, Prentice Hall, Englewood Cliffs, N.J. 07632, 1995, ISBN 0-13-200809-2, herein incorporated by reference, for theoretical foundations of error detecting and error correcting coding schemes, including XOR computations.)

In the case of storage controllers for RAID storage systems, the application code is the RAID code, which is responsible for managing the data movement from the host interface to the disk storage. This conventional architecture is shown FIG. 1, which shows a high-level architectural diagram of a controller system 101 (such as for example, an exemplary Mylex Corporation DAC960SF, hereinafter also referred to as the "SF" system). In a system 101 design such as this, all of the host's data is cached in RAM 110 associated via a memory interface 112 to the XOR Processor 108. We refer to this XOR processor RAM to as the cache memory 110. The RAM associated with Application processor 102 via a second memory interface 106 is referred to as the Control Store 104.

System 101 also includes a primary bus 114, such as a PCI bus, interfacing between the XOR processor 108 and Application processor 102 and host interface side component Fiber Chips 122, 124. Note that in the FIG. 1 system, the XOR processor and Application processor may be the same unit. System 101 further includes a secondary bus 116, such as a PCI bus, interfacing the XOR processor 108 and Application processor 102 with disk side components SCSI Chips 126, 128, 130, 132, 134, 136. The SCSI chips provide support for data storage subsystems such as individual disk drives 138 or RAID disk subsystems 140.

The problem with attempting to design a high-bandwidth controller using this architectural model is that the system 101 becomes bottle necked due to the XOR processor 100-to-cache memory 110 interface 112, which has heretofore been limited to a speed of about 133 MB per second. Even if and when faster memory interfaces are developed, the architecture is limited.

We now describe a conventional typical RAID controller configuration relative to system 101, illustrated in FIG. 1. If one considers a standard RAID 5 type write operation to a 7+1 group, one can calculate the theoretical maximum bandwidth of the system 101 controller design. The "7+1" refers to seven data disks and a single disk allocated to storing parity information. For bandwidth limited write operations, we assume for purposes of this calculation that an entire RAID stripe is written at one time, so for 7n writes from the host (that is, for a complete stripe write operation, n being the size of the cache data line), 7n stores are done into the cache RAM 110, 7n reads are performed from the cache RAM 110 to generate parity, a single n write is performed into the cache RAM 110 for the parity data, and finally 8n reads are performed from the cache RAM 110 to write the host and parity data to disk on the disk side 120. So, a single stripe write from the host actually requires 23n memory operations (7n data stores +1n store a parity +7n reads +8n reads) across the XOR memory interface 112.

For a 133 MB per second conventional interface (handling 23n memory operations), the value of n is about 5.78 MB/second, that limits the total bandwidth for the host interface to be 40.48 MB/second. The host interface bandwidth is 7n, or the maximum number of write operations (writes) to achieve 23n total usage of the memory interface 112. This number assumes a theoretical 100 percent efficiency for the memory interface 110, while typical actual maximum throughput is about 19 MB/second yielding a real-world efficiency of only about 47 percent. This level of system throughput may not be adequate for state-of-the-art systems in the future.

Therefore, there remains a need for a solution to the data management problem in the controller to address bandwidth, throughput, and other limitations in architecture and operational method.

This and other problems and limitations are solved by the invention structure and method.

SUMMARY

This inventive provides a multiple level cache structure and multiple level caching method that distributes input/output processing loads including caching operations between the plurality of processors to provide higher performance input/output processing, especially in a server environment. In one aspect, the invention provides a method of achieving optimal data throughput by taking full advantage of multiple processing resources (either processors or controllers, or a combination of the two) in a system. In a second aspect, the invention provides a method for managing the allocation of the data caches in such a way as to optimize the host access time and parity generation. In a third aspect, the invention provides a cache allocation for RAID stripes guaranteed to provide the fastest access times for the exclusive-OR (XOR) engine by ensuring that all cache lines are allocated from the same cache level. In a fourth aspect, the invention provides for the allocation of cache lines for RAID levels which do not require parity generation and are allocated in such manner as to maximize utilization of the memory bandwidth to the host interface. In a fifth aspect, the invention provides parity generation which is optimized for the use of whichever processor is least utilized at the time the cache lines are allocated, thereby providing for dynamic load balancing amongst the multiple processing resources available in the system. In a sixth aspect, the invention provides an inventive cache line descriptor which includes enhancements over other conventional approaches for maintaining information about which cache data pool the cache line resides within. In a seventh aspect, the invention provides an inventive cache line descriptor which includes enhancements to allow for movement of cache data from one cache level to another. In an eighth aspect, the invention provides a cache line descriptor that includes enhancements for tracking the cache within which RAID stripe cache lines siblings reside. System, apparatus, and methods to support these aspects alone and in combination are also provided.

DETAILED DESCRIPTION OF EMBODIMENTS OF THE INVENTION

Figure 1:
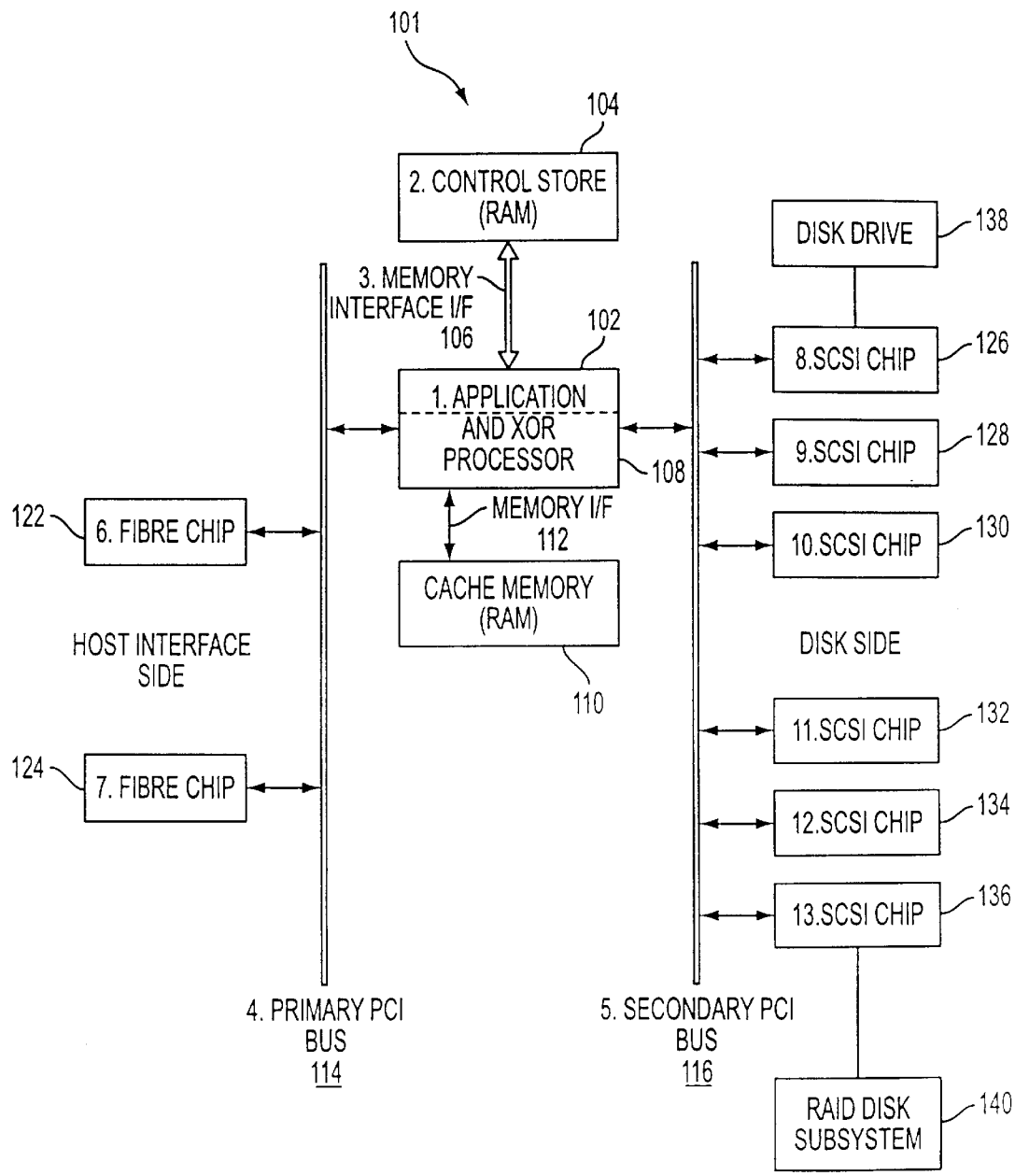
FIG. 1 is a diagrammatic illustration showing a typical RAID controller of conventional design.
Figure 2:
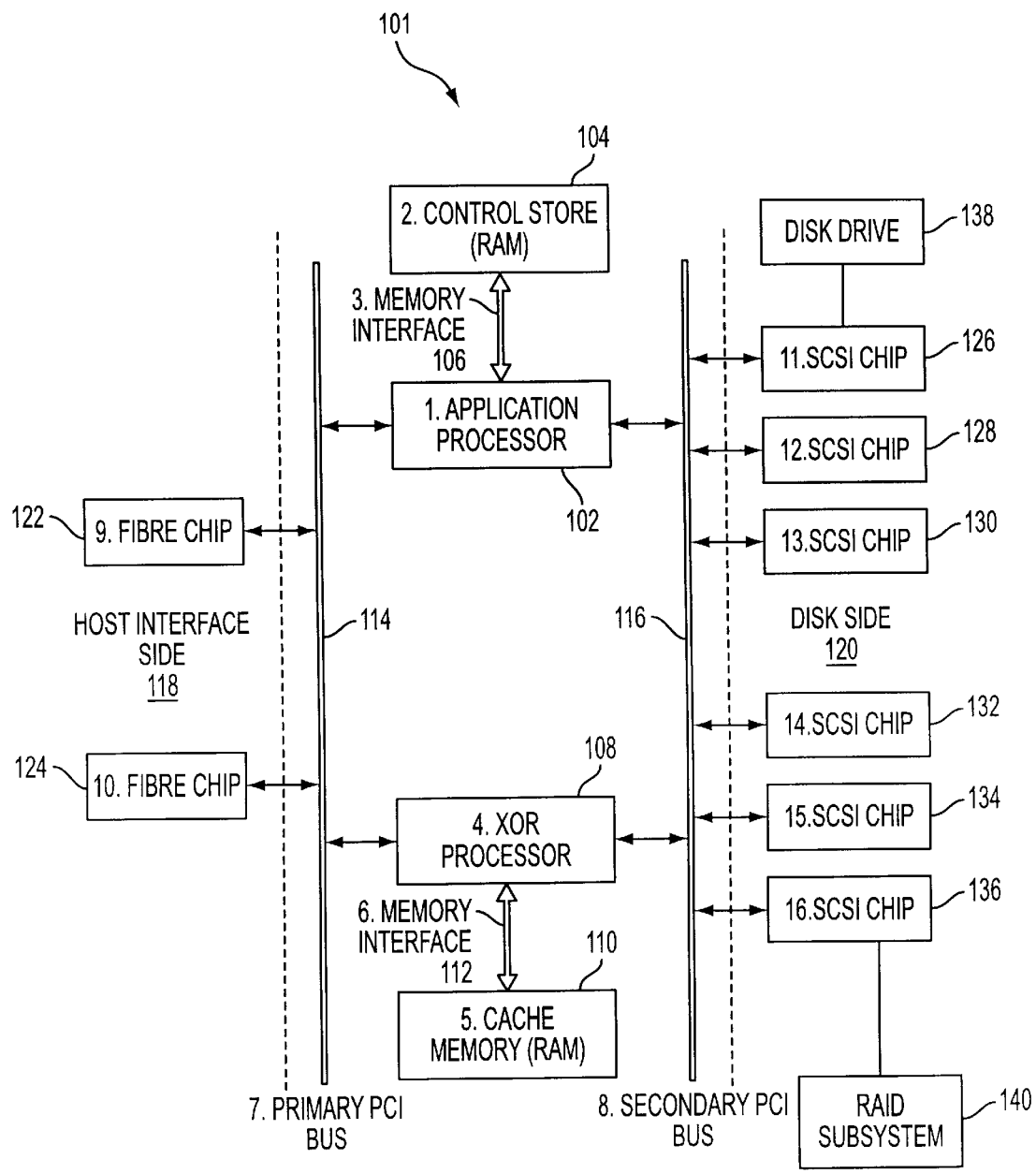
FIG. 2 is a diagrammatic illustration showing an exemplary controller high-level architecture.

We now describe an exemplary embodiment of the inventive structure with respect to FIG. 2. The invention provides a multi-level cache architecture to be used in either a multi-processor or a multi-controller storage environment. A multi-processor storage environment is one which includes at least two processors used to manage the data received from a host computer. The multiple processors appear as a single controller entity to the host computer. The multiple processors are designed to distribute the data management operational load to achieve better performance, including better data throughput, than a single processor can provide. A multi-controller storage environment is different than a multi-processor environment in that at least two controllers are present to provide higher performance, greater data protection, and multiple data paths. The greater performance in the multi-controller environment is achieved through combining the performance of each individual controller. The data protection is achieved by removing the controller as a single point of failure. The multiple data paths are achieved through combining the data paths available in each controller. (Each controller has access to the same backing media.) Hybrid configurations having at least one processor and at least one controller, and having a plurality of controllers and a plurality of processors, are also within the scope of the invention.

One technique to take advantage of additional processing resources, whether they be multiple processors or multiple controllers, is to allow each entity to manage a data cache. Management of a data cache includes being able to execute RAID primitives or instructions. RAID primitives include, but are not limited to: cache line allocation, searching a cache for a particular cache line, performing parity generation operations, accepting data from a host system, and writing data to the backing storage. By allowing multiple processing resources to operate on multiple data caches, the system can accomplish more operations in parallel, thus increasing the amount of work done in a period of time. This parallel processing should be amoung at least some (for example two) of the multiple processing resources and corresponding data caches.

One problem that arises in multi-processor, multi-controller, and hybrid multi-processor/controller storage environments is that when there are two or more pools of host and parity data, some data is kept in a local memory (for example in a control store 104 memory associated with an application processor 102) and some data is kept in a remote memory (for example in a cache memory 110 associated with an XOR processor 108). The inventive structure and method provide means for keeping track of the various pools of data in an efficient and useable manner.

For the purposes of this description, data which is immediately accessible to the processor, i.e., data which does not need to be copied from another location, read from disk, or the like, will be referred to as level 0 (primary) cache. Data which is stored on a different controller, in a remote cache, or on a different medium, but can be accessed by the primary processor through copy or move operations will be referred to as level 1 to level n cache. All caches besides the level 0 cache will be collectively referred to as the secondary cache. For the purpose of this discussion there can be multiple pools of level 1 to level n cache all which may require different amounts of time to move data from the secondary cache to the level 0 cache.

Each cache level can consist of a multiple data storage pools. In the embodiment of FIG. 2, the controller has only a level 0 cache, but it can be made up of a first data pool kept in control store, and a second data pool kept in the cache memory. The two pools are considered at the same cache level since both pools are managed by the application processor. This latter architecture is considered a "split cache" architecture, whereas a configuration having multiple caches managed by different application processors is considered a "hierarchical cache" architecture. The attributes of these two architectures are described in greater detail below.

In such a system, the first problem is to keep track of the available data and how and/or where it is located. This can be done through a multiple level hash table. A first hash table lookup operation is performed to determine or identify data which is readily available in level 0 cache. In the event of a host read, the table would contain data which can be immediately transferred from the level 0 cache back to the host. For writes, this might be the data which would be used in a parity calculation, so it would be data which can be read by the XOR engine.

A second level hash lookup operation is performed to determine or identify data which can be brought from any remote cache in a single hop or operation. In order to determine the most efficient place to access the data from, the hash table maintains an expected transfer time value from each remote cache. Thus, when the same data exists in multiple places, a decision can be made as to where to obtain the data in the shortest possible time can based on the time required to transfer the data from the remote caches based on the stored expected transfer time values.

To keep the data consistent in the multiple caches the controllers in the system must communicate with each other when moving data to and from or invalidating data in any cache except the level 0 cache. The assumption is that data in any cache other than level 0 is considered shared data. There are certain exceptions to this rule, such as in a system having a controller in which a single processor is responsible for maintaining a split level 0 cache. In this case, there is no requirement to communicate changes in either piece of the cache.

The next issue is where to place the data when it is brought in from either the host or from a disk drive. If data needs to be read from disk to perform a parity calculation there is no reason to put it into primary memory if the secondary memory is required to be used to perform the XOR calculation. This requires that the cache fill algorithms need to be programmable based upon the type of operation which is being performed and the type of data which is being allocated. The list of data types would include most read data, write data, parity generation read data, parity data. Then the allocation routines would be intelligent enough to always allocate the parity data from the memory pool which is used for the XOR operation. In addition, if multiple XOR engines are available in the system, the memory allocation routines would then allocate the parity data in the same memory as the host stripe data.

The cache allocation routines are designed to optimize where the XOR calculation is performed and to maximize host throughput. This is done through knowledge of host computer access patterns to data. In general, after a host computer writes data it rarely performs a read of the same data in close proximity time wise. Write data therefore does not generally need to be readily accessible to the host computer and can be kept in a lower level cache. The cache level which write data is placed in needs to be qualified with the availability of the XOR processor for RAID 3 or RAID 5 system drives. It does not make sense to move data into one cache and then have to copy it to another cache to perform an XOR operation.

The data is moved into various cache levels based upon the host operation. This is done by adjusting the level of the cache based upon how the host has been accessing the data. This is done to optimize the availability of data and the availability of cache lines within a cache level. An example being that a host computer rarely performs a read of data just written. This means that the cache which is the shortest path to move data to the host should be reserved for read data and write data can be placed into a cache which takes slightly longer to access by the host. The idea is to minimize read access penalties at the cost of some write penalty. This can be modified to optimize for write speed if the user so decides. This data movement algorithm is designed to be self tuning in that it will adapt to optimize the data placement based on host accesses. If the host is performing a large number of writes relative to the number of reads, it will adjust to optimize the write data placement at the expense of the read operations. The opposite is also true.

We also assume that host read data in general is either completely random or sequential in nature. To accommodate this, read data should be kept in the level 0 cache if space is available to allow fast access by the host system. In the event of sequential read data patterns, the read ahead data can be readily accessed by the host computer.

Parity data needs to be kept with its associated write data. Thus, whatever the cache level the write data is placed in, the parity data needs to be placed at the same level (i.e., in the same cache). The same is true of parity generation read data which is read to allow parity to be generated. The parity data needs to be kept with host write data and host read data from the same RAID stripe in order to alleviate the requirement of moving data from one cache to another to perform an XOR operation.

Another issue is automatic promotion and demotion of data from each level of caching. This feature also includes a set of caching algorithms or procedures which are used depending upon the data being operated on. The caching algorithms are designed to move data between various cache levels to free up space in certain caches and to adjust for various host computer access patterns. The current dual-active architecture uses several different rules depending on if the write data is going to a write through or write back system drive. All read data goes through the standard promotion to the level 0 cache upon a read. With a multiple level cache, write data could be demoted through multiple levels, the first being the level 1 cache, followed by a fast write to a RAID 1 protected drive (which could be a level 2 cache), and finally to a RAID 5 or tape as a backup storage (which would be considered the level 3 cache for this discussion). Each host visible system drive could have its own set of caching algorithms depending upon how the data is being used.

In one aspect, the inventive structure (apparatus and system) and method provide a multiple level cache that allows a system which has multiple processing resources (either multiple-processors, multiple-controllers, or a combination of one or more processors and one or more controllers) to better utilize all of the processing resources to build a higher performance input/output (I/O) processing system. The multiple level cache allows multiple memory controllers to be used to help distribute the workload of moving data to achieve maximum memory bandwidth.

Under this scheme, the memory available to each of the plurality of processors is used to store host data, thus allowing the workload of each memory bus to be cut in proportion to the number of processors and the number of memory stores sharing the workload. For example, if there are two processors, the workload is nominally cut by one-half to each processor, and if four processors, by one-quarter. For the purposes of this description, there are four data types to consider: "Host write data" is data written by the host computer to be stored on the backing media. "Host read data" is data requested by the host system and needs to be read from the backing media. "Parity data" is data that is generated by the storage controller. Parity is used to protect the data against a failure in the backing media. Finally, "parity generation read data" is data that is read from the backing media by the storage controller and is required to allow the parity data to be generated. Parity generation read data itself is not generally retrieved from the backing media to be transferred to the host system.

In the system 101 of FIG. 2, application processor memory interface 106 and XOR memory interface 112 together allow for an aggregate memory bandwidth, that is the bandwidth of the application processor memory interface 106, and the XOR processor memory interface 112 combined, of about 266 MB/second. Recall that for a single memory controller having a 133 MB/second interface, the total host interface bandwidth assuming one-hundred percent efficiency was 40.5 MB/second. When the same calculations are performed for a dual-processor configuration according to the invention, the values are doubled as a result of the added capability of two processors and two interfaces, and one achieves a theoretical maximum bandwidth (100% efficiency) of 81 MB/second and an anticipated actual bandwidth of about 38 MB/second assuming the same 47% efficiency measured for the conventional configuration.

Figure 3:
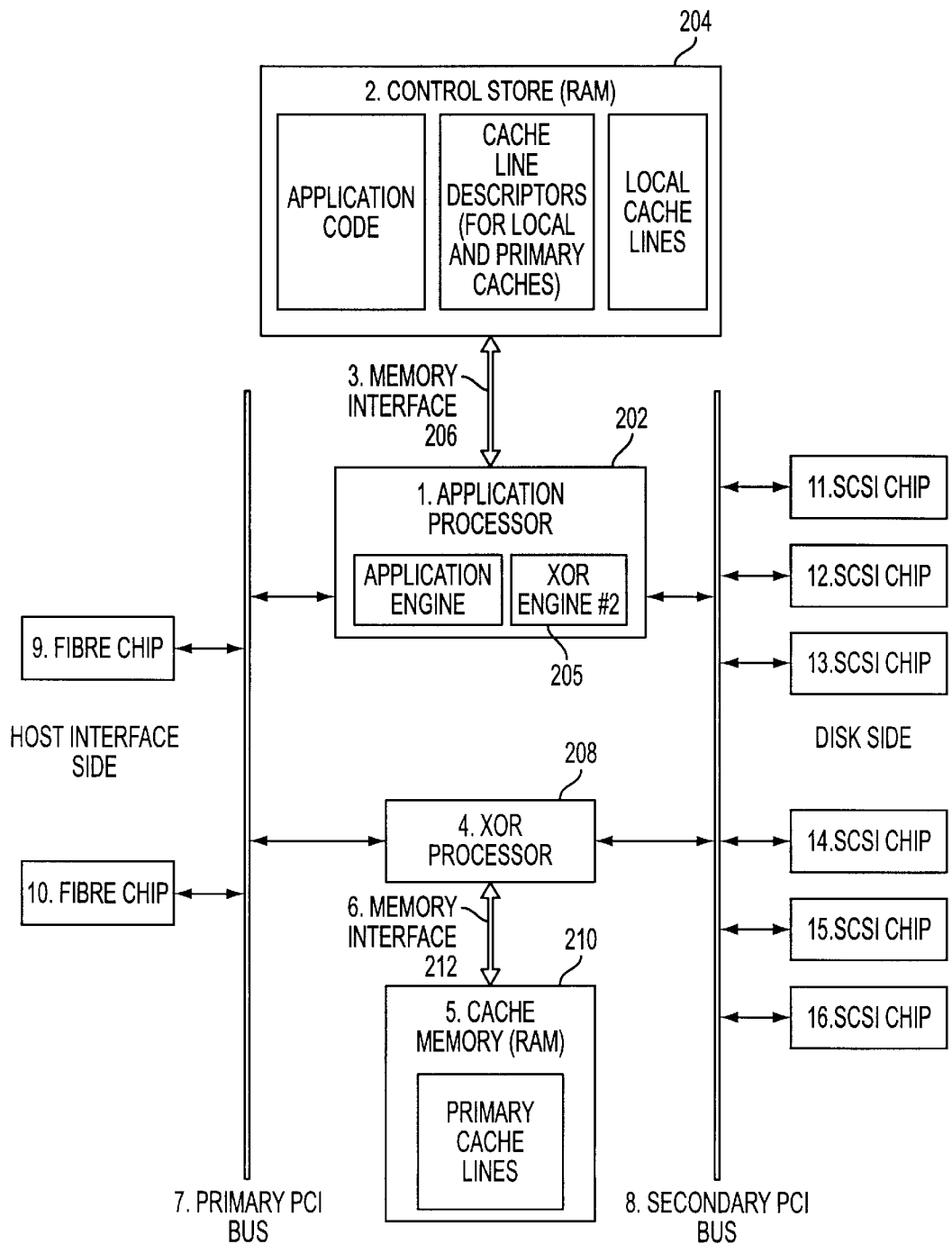
FIG. 3 is a diagrammatic illustration showing an exemplary controller high-level architecture according to the invention for a split or distributed cache configuration.

In the exemplary structure and method, we describe a two-controller/processor two-interface two ache configuration relative to the exemplary embodiment illustrated in FIG. 3; however, those workers having ordinary skill in the art will appreciate in light of the description provided herein that the invention is not limited to such two-processor/controller, two-interface, two-cache configurations, rather systems having two, three, four, five, six, seven, eight, or greater number of processors, interfaces, and cache memories will benefit from the inventive structure and method.

Unfortunately, one problem with merely separating the host data caches between two processors (for example, between the XOR processor 108 and the Application processor 102) is that both processors must either be capable of performing XOR calculations, or data must be copied between the two caches 110, 104. This later copying operation would unfortunately defeat the purpose of putting the data in separate caches in the first place. Therefore, it is preferable to provide each processor the capability of performing all XOR calculations. In this scheme, knowledge of which cache the data resides in is required to allow the parity generation code to determine which of the two (or more) XOR engines needs to be used to compute the parity data. Returning briefly to the inventive configuration in FIG. 3, both XOR processor 210 and Application Processor 202 (Application processor 202 includes an "application engine" and a new "XOR engine 2") are provided the capability to perform XOR calculations, so that under the inventive structure and method, both become XOR engines. Modifications are also made to the structure or organization and operation of the control store memory 204 and the cache memory 210. Parity generation is optimized for the use of which ever processor is least utilized at the time the cache lines are allocated. This provides for dynamic load balancing amongst the processing resources in the system. The inventive structure and method also provide that the allocation of cache lines for RAID levels which do not require parity generation are allocated in such manner as to maximize utilization of the memory bandwidth to the host interface.

Figure 4:
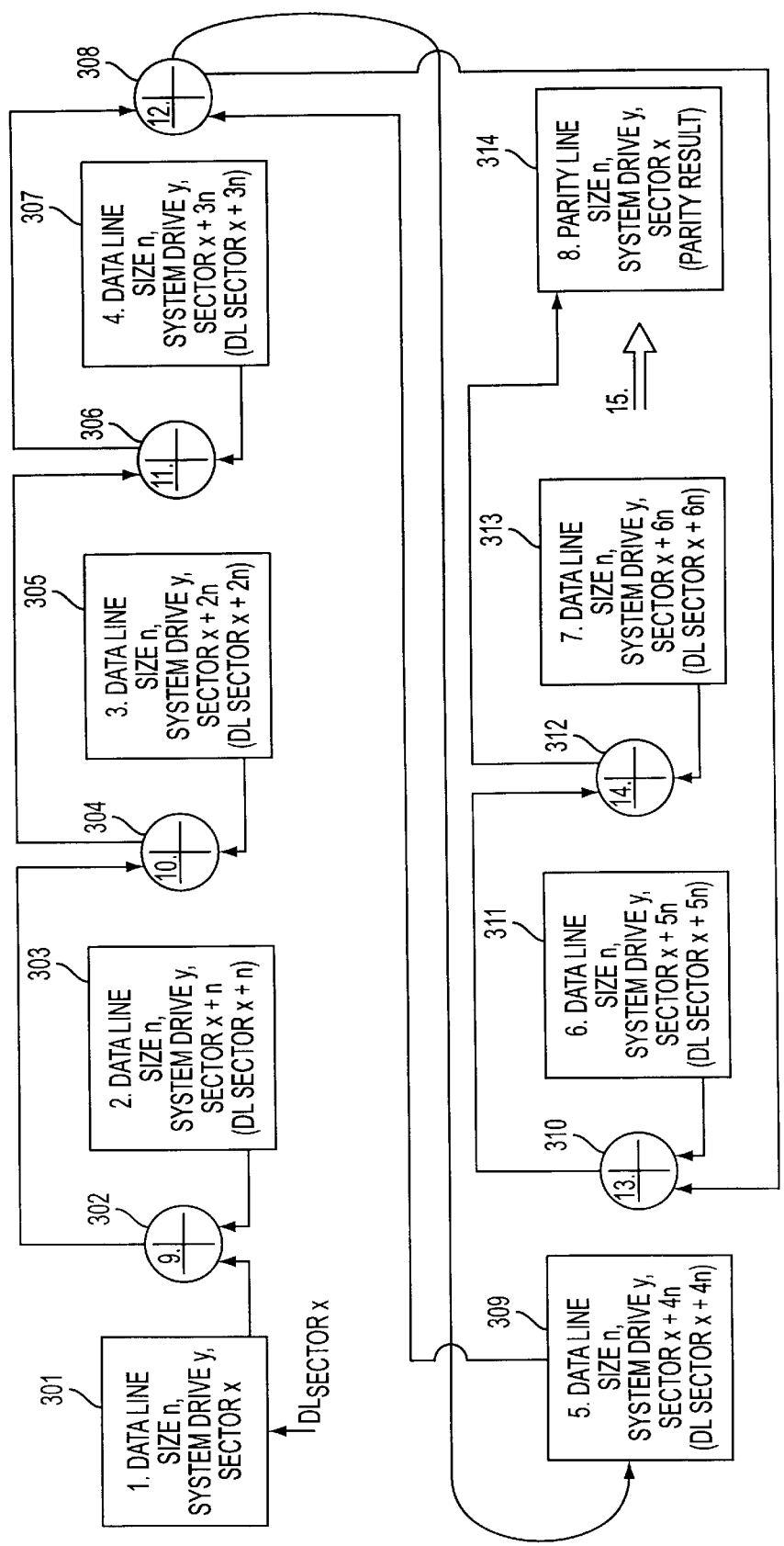
FIG. 4 is a diagrammatic illustration showing an embodiment of a 7+1 XOR calculation.

Since the parity calculation is performed on an entire data stripe, knowledge of where a cache line's siblings reside is also required. Reed-Solomon coding is frequently used to store data in disk drive systems. In RAID terminology, a RAID 5 stripe is made of all the cache lines which will be stored on the data disks plus the parity disk. A data stripe consists of all of the cache lines which are stored on the data disks, minus the parity disk. To compute parity, all of the cache lines which make up a data stripe are XORed together. A 7+1 configuration requires seven data cache lines plus a parity cache line to store an entire RAID 5 stripe. The various cache lines which make up a RAID 5 stripe are considered siblings. FIG. 4 shows an example of how the data cache lines are XORed together to compute the parity cache lines data; however, those workers having ordinary skill in the art will appreciate that there are numerous alternative XOR configurations that accomplish this XOR operation. (See for example, "Error Control Systems For Digital Communication and Storage, Stephen B. Wicker, Prentice Hall, Englewood Cliffs, N.J. 07632, 1995, ISBN 0-13-200809-2, herein incorporated by reference, for theoretical foundations of error detecting and error correcting coding schemes, including XOR operations.)

We now briefly describe the 7+1 XOR calculations illustrated in FIG. 4. The calculation essentially consists of the series of sequential XOR operations utilizing data lines of size n from system drive y, for sectors that progress through the sequence sector x, sector x+n, . . . , sector x+6n, to yield a parity line of size n, for system drive y and sector x. More particularly, for a plurality of data lines (DL) for system drive "y" having size "n" where n is the RAID group's data stripe size, we generate the result $DL_{sector\ x} \oplus DL_{sector\ x+n}$, where the notation "$\oplus$" denotes the XOR or "exclusive-or" operation. This first result is XORed with $DL_{sector\ x+n}$ which in turn is XORed with $DL_{sector\ x+2n}$ which in turn is XORed with $DL_{sector\ x+3n}$ which in turn is XORed with $DL_{sector\ x+4n}$ which in turn is XORed with $DL_{sector\ x+5n}$ which in turn is XORed with $DL_{sector\ x+6n}$ to yield a final result for the Parity Line for sector x of system drive y having stripe size n. These operations are illustrated as steps 301 through 314 in FIG. 4 though intermediate results are not specifically identified. Implementations of XOR processing are well known in the art and not described in greater detail here.

When a host operation requests a cache line to be used for either read operation or a write operation, an allocation routine is called. To determine which cache a particular cache line should be allocated from, it needs to know the RAID level of the system drive, and in the case of RAID Level 3 or RAID Level 5 operations it also needs to know if other sibling cache lines have been allocated, and if they have been so allocated, from which cache. The allocation of the data caches is managed in such a way as to optimize the host access time and parity generation.

For RAID levels other than RAID 3 and RAID 5 a single cache line has no direct relationship to other cache lines in the same RAID stripe. For this reason, there is no requirement that cache lines from the same RAID stripe reside in the same cache.

There is a third aspect in the RAID 3 and RAID 5 cases which may advantageously be performed for performance tuning, that is the XOR processor usage. The XOR processor usage analysis is an optional procedure of balancing the workload between multiple XOR processors in the system. If the XOR processors are fully integrated, the application processor is sitting idle waiting for XOR operations to complete. While it is waiting for the XOR processor, it makes sense for the Application processor to be able to perform XOR operations itself, in addition to managing the host and disk interfaces. This optional capability is provided by allowing the application processor the ability to access cache lines and by adding additional code to perform the XOR operation. The access to the cache lines can be done by moving data from a data cache to a local temporary store or by adding a data cache which is local to the application processor. The additional data cache is the split cache concept.

Having now provided an overview of conventional configurations and identified some aspects of the inventive structure and method, we now identify specific changes which are either required, or optional but advantageous, in implementing the multi-level cache in a multi-processor and/or multi-controller environment.

These changes to accommodate multiple data caches in the system include: (i) providing a new cache line descriptor data structure; (ii) providing a new cache line boot-up allocation strategy, for the initialization of the cache structures; (iii) providing a new data stripe hash table; (iv) providing a new cache line run-time allocation scheme based on cache line usage criteria and the stripe hash table data; and (v) providing a new (or second) XOR engine which resides or executes on the application processor. Each of these changes or additions to accommodate the inventive multiple level cache are described in greater detail in the sections that follow.

Cache Line Descriptor Data Structure

The cache line descriptor (CLD) is used by the RAID application to keep track of all of the data stored in the cache which can include data written and read by the host system. The CLD data structures are organized in the application processor 102 control store memory 104.

The CLD is used to manage both split cache and hierarchical caches. The difference being that in a split cache, one processor maintains a single pool of CLDs which are used to manage multiple data pools, whereas in a hierarchical cache, each level of cache has a processor which is responsible for the data and maintains its own set of CLDs to manage its data pool. In the split cache design all of the CLDs reside in the application processors control store RAM. This allows a single processor to manage multiple data cache pools. In the hierarchical cache, each cache level is managed by a separate cache processor (which may also be an application or an XOR processor) which has its own set of CLDs. One cache line descriptor is provided for each cache line in each cache. Descriptors are identified and described with respect to the exemplary CLD data structure illustrated in FIG. 5 and the cache line descriptors identified in Table I.

The cache line descriptor is used to manage cached data. The types of cached data have already been described. The CLDs provide various pointers to manage data movement. Management of data movement is an area where the inventive structure and method provide numerous advantages. Some CLD fields and their operational functionality are highlighted below. Other CLD fields are listed in Table I along with a brief description of their functionality.

Writing out dirty cache lines ("host writes") is handled through the linked list pointer to the next line in the write-back queue ("1_next_wbk") and the linked list pointer to the previous line in the write-back queue ("1_prv_wbk"). These pointers are used to place a cache line on a queue of cache lines to be written out to the backing store by a process ("Write Back Manager") in the application code procedures.

The linked list pointer to the next line in the least recently used (1ru) chain ("1_nxt_1ru") and the linked list pointer to the previous line in the 1ru chain ("1_prv_1ru") use a counter to handle reuse of a cache line that is not longer in use. A cache line can be reused when no processes (host read or host write, rebuild, write back operation, or the like operations) are utilizing the cache line. The cache lines are reused in the access order. The last accessed cache line (used least recently) will be reused first, hence the name of the list they are stored on, least recently used.

The linked list pointer to the next line in the hash link ("1_next_hash") and the linked list pointer to the previous line in the hash link ("1_prv_hash") are involved with finding a cache line based on a system drive and sector number.

The linked list pointer to the next cache line in the RAID stripe ("1_nxt_stripe") and the linked list pointer to the previous cache line in the RAID stripe ("1_prv_stripe") and the stripe hash table are instrumental in providing a method to determine for RAID 3 and RAID 5 system drives, which RAID stripe a cache line is associated with. In this manner, the conventional cache line descriptor has been enhanced to allow for tracking which RAID stripe cache lines siblings in which cache may reside within.

The copy complete ("copyComplete") field is used to determine when the copy of cache line from one cache to another cache is completed. This is an enhancement of the conventional cache line descriptor that allows for movement of cache data from one cache level to another.

The cache level ("Cache level") field is used to identify which cache a cache line is allocated from. This is an enhancement of the conventional cache line descriptor which allows for maintaining information about which cache data pool the cache line resides within.

The exclusive-or engine ("XOR engine") field is used in a split cache architecture design to identify which XOR engine is to be used to perform the XOR calculation. It is needed when a cache level has multiple XOR engines which are able to perform the parity calculation.

Figure 5:
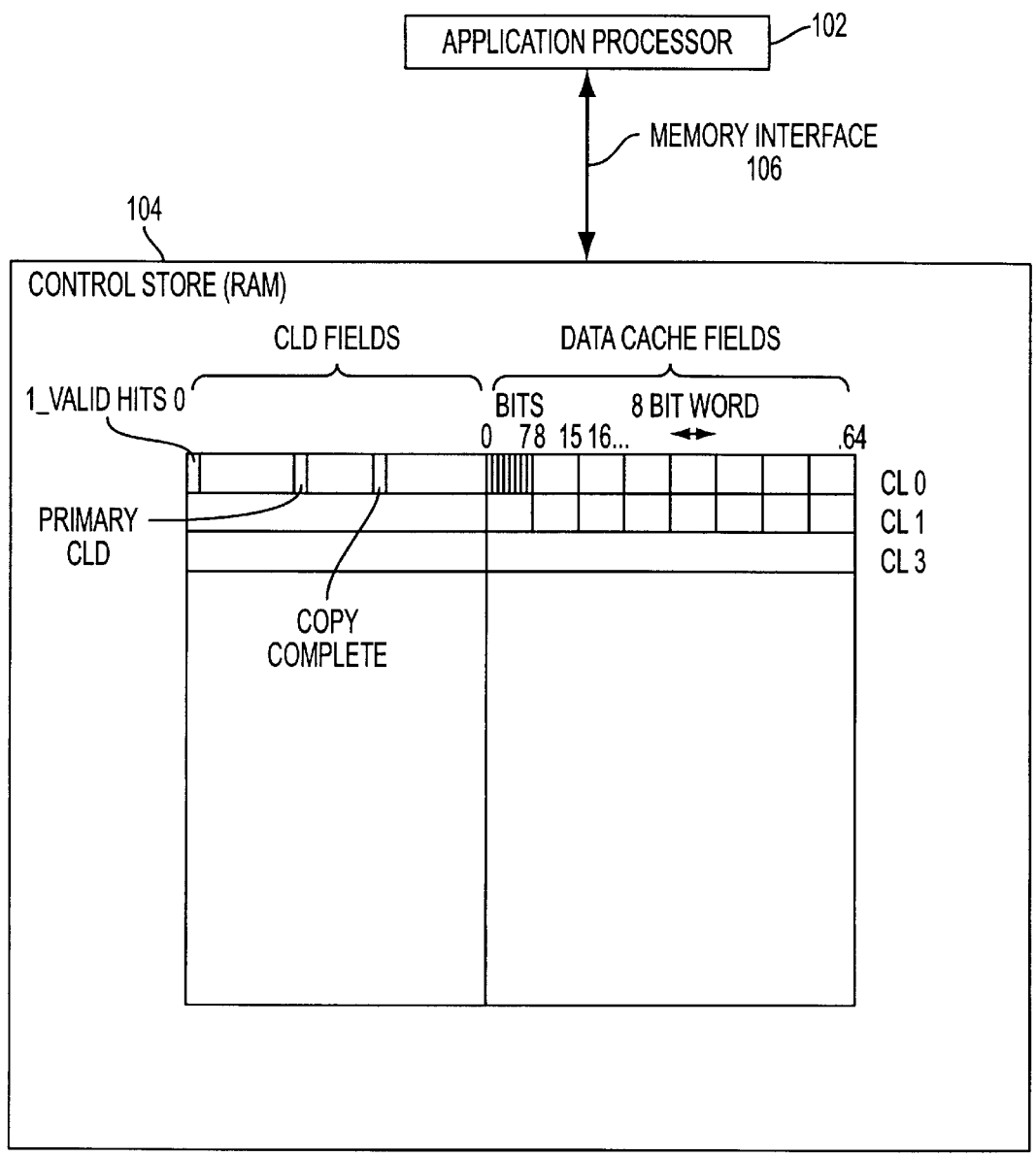
FIG. 5 is a diagrammatic illustration showing an embodiment of CLD/cache line data structure organized in a memory associated with a memory interface and processor.

In the exemplary embodiment illustrated in FIG. 5, each cache data line has its own associated CLD. In the exemplary embodiment, the cache line stores data (for example 8 kbyte, 16 kbyte, 32 kbyte, 64 kbyte, or the like of data), and the CLD requires an additional 96 bytes. These bytes are advantageously arranged contiguously from start address to (#CLD*96) for ease of access, but other arrangements may be implemented.

While CLDs having certain specific parameters have been described, some of the parameters though providing certain advantages, are optional and need not be provided in a system. More particularly, CLD parameters that provide capabilities such as sector system drive type (data, parity), users status (read in progress, write in progress, and the like), valid blocks, dirty blocks, are generally necessary to provide the required operation, while others may optionally but advantageously be provided.

Several CLD field parameters or pointers are desirable for optimal operation of the inventive structure and method. They include System Drive and Sector and the number of blocks which are provided in the "1_blk" parameter field, cache level, next stripe link ("1_nxt_stripe"), previous stripe link ("1_prv_stripe"), copy complete ("copyComplete"), and XOR engine ("xor_engine") which identifies one of two defined values (primary XOR or local XOR).

We now describe how each of selected CLD parameters are used or otherwise contribute to the invention. We conveniently divide the description between "write operation" (writes) and "read operation" (reads).

During a host write operation, the CLD structure is used to maintain the information regarding where the host intends the data to reside. The System Drive field is used to denote the system drive or Logical Unit Number (LUN) where the data is to be written, the Sector is the starting sector, ranging from zero to the maximum sector number, on the system Drive, where the maximum sector number is based on the logical size of the System Drive. (For example, a system drive unit consisting of five 2-megabyte (MB) drives, configured as a RAID 5 system drive, would have a maximum storage capacity of about 8 MB. The sector range for this system drive would be from 0 to 16,777,216.) The Number of Blocks field is then set equal to the size of the host write request. The number of blocks uses a unit measurement of bytes, where one sector is equal to 512 bytes. These System Drive field and the Number of Blocks field are filled in upon the reception of a host write request.

The Cache Level field stores the integer value identifying which cache level all cache lines for the stripe were allocated. The Next Stripe Link and Previous Stripe Link fields are used to maintain a linked list of all cache lines that are part of a RAID stripe. For example, in the five-disk RAID S system drive described immediately above, five cache lines will be linked together using these fields.

The Xor Engine field holds the value of which Xor Engine will perform the parity calculation. If a copy is required from one cache to another, the Copy Complete Boolean field is used to indicate the start of a Direct Memory Access (DMA) operation and the completion of that operation.

The CLD structure actively tracks the status of the newly written host data. The CLD tracks the writing of the new host data to disk, and also tracks the generation of parity for the RAID stripe that the cache line is part of. When the cache line is no longer required, it is released, and the System Drive, Sector, and Number of Blocks fields are all set to an invalid value. The Stripe Link fields are also set to zero to indicate that they are no longer part of an active RAID stripe.

During a host read operation, the CLD structure is used to maintain the information regarding where the host intends to read the data from. The System Drive field is used to denote the system drive where the data is to be read from, the Sector is the starting sector on the System Drive. The Number of Blocks field is then set equal to the size of the host read request. These fields are filled in upon the reception of a host read request.

The Cache Level field stores the integer value of which cache level all cache lines for the stripe were allocated. The Next Stripe Link and Previous Stripe Link fields are used to maintain a liked list of all cache lines that are part of a RAID stripe.

The Xor Engine field is not used during normal read operations. This field is used when the RAID 5 system drive is in a degraded mode, one drive has failed in the group, and in that case, the host data is not always read directly from disk, but may have to be regenerated using the parity algorithm. This field is then used in the same manner as for write operations. The Copy Complete field is used in the exact same manner as for write operations.

The cld_type is used to keep track of the state a cache line is in for use during failover/failback and cache flushes. Cache flushes occur when data needs to be written to disk so that the cache on one controller is coherent with the cache on another controller. In one embodiment, this is used during rebuild operations. Failover occurs when a partner controller has failed and the writes that the partner controller did not commit to disk need to be completed by the survivor controller. Failback occurs when the cache needs to be reorganized to allow the partner controller to have an area in which it can copy write data into its partner's cache. This is used to protect data when a controller fails. The values for cld_type are: CM_CLD_RW (Read/Write cache line type), CM_CLD_COPY (COPY cache line type, for use by the partner controller), CM_CLD_TRANSIT (Cache line in transition during FAILBACK, going from CM_CLD_RW to CM_CLD_COPY state), CM_CLD_LRU (LRU or MRU CLD pointer, used to indicate that this cache line cannot be used for accepting data), and CM_CLD_FLUSH (Line is marked to be flushed. Waiting for the data to be written to disk, it will transition back to CM_CLD_RW when the data is written).

The free_copy_table is used to keep track of which copy cache lines (cld_type CM_CLD_COPY) this controller can write data into in its partner controller's memory. It indicates which cache lines are currently in use and which cache lines are available to write new data into.

The CLD structure actively tracks the status of the host read operation data. Once the read is complete the CLD is no longer required and may be released. Behavior at this point varies based on the caching algorithms implemented to maintain least recently used and least frequently used cache lines, of which many variations are known in the art, and not described here in detail.

TABLE I

Summary of selected exemplary Cache Line Descriptors (CLDs)

| Item | Description |
| --- | --- |
| l_valid | valid byte indicator (flag) for SCSI copy |
| sra_flag | super-read-ahead flag is used to instruct the application code about how a cache line was used in a read ahead operation and for keeping statistics about the read ahead performance |
| SRA_NOT_PREFETCHED | set for normally obtained cache lines |
| SRA_PREFETCHED_LINE | set when a cache line is allocated for read ahead operation |
| SRA_HIT_ON_PREFETCH | set when a read hit from the host occurs on the cache line that was read ahead. |
| XOR engine | field that tells the application code which cache the cache line with allocated from. It is set during boot time and not changed during run-time. In the current system, there are two types of XOR engines: PRIMARY_XOR and LOCAL_XOR. |
| PRIMARY_XOR | set for the cache lines which exist in the primary XOR processors cache memory. |
| LOCAL_XOR | set for the cache lines which exist in the application processors controlled store memory (local XOR engine). |
| copyComplete | a flag used to determine when cache line copies which are done by an external copy engine are completed. It is set to FALSE at the beginning of the copy operation, and to TRUE when the operation completes. |

TABLE I-continued

Summary of selected exemplary Cache Line Descriptors (CLDs)

| Item | Description |
| --- | --- |
| l_blk | contains the information needed to keep track of what host data exists in the cache line. It tells the system drive, sector, the type of the cache line (date, parity, etc.), and the group number (which RAID stripe this cache line belongs to). |
| lock | lock count - a counter used to keep track of how the cache line is being used. |
| wrlock | write lock count - a counter used to keep track of how the cache line is being used. |
| cache level | which cache level (0, 1, . . . , n) the data exists in. |
| l_stat | cache line status - VALID, PART_VALID, DIRTY, WBK_QUEUED, GEN_ON, RX_SIT, WX_SIT |
| VALID | Possible value of l_stat-cache line is fully valid, all data is good |
| PART_VALID | Possible value of l_stat- some of the data cache line is valid |
| DIRTY | Possible value of l_stat- cache line is fully dirty, all sectors need to be written to disk |
| WBK_QUEUED | Possible value of l_stat- cache line is sitting on the right back queued, awaiting being written out to disk |
| GEN_ON | Possible value of l_stat- write back operation has been started on this cache line |
| RX_SIT | Possible value of l_stat- read operation has been initiated on this cache line |
| WX_SIT | Possible value of l_stat- write operation has been initiatied using this cache line |
| l_used | used to keep track of how cache lines be used. The counter l_used indicates the user count. |
| l_woken | used to keep track of how cache lines be used. l_woken indicates the number of woken up users. |
| l_vbm | valid bit map - keeps track of which sectors are valid in a cache line, the data in the cache line corresponds to the latest data written by the host. |
| l_dbm | dirty bit map - indicates which sectors have been written to the cache line by the host, but not yet been written to disk. |
| hsh_tb_indx | hash table index - indicates which array entry this cache line is hung off of on the hash table, this is a compute value stored to reduce the number of times it needs to be re-computed. |
| cld_indx | index of this entry in c_l_d |
| time_stamp | Right back queued time -time_stamp - used to keep track of when a cache line was placed on the right-back queue. Used for the cache line aging algorithm to determine when it should be removed fr0m the hash table and written to disk. |
| l_nxt_lru | pointer to next line in lru chain |
| l_prv_lru | pointer to previous line in lru chain |
| l_nxt_hash | pointer to next line in hash link |
| l_prv_hash | pointer to previous line in hash link |
| l_nxt_wbk | pointer to next line in wbk queue |
| l_prv_wbk | pointer to previous line in wbk queue |
| l_nxt_stripe | pointer to next cache line in the RAID stripe |
| l_prv_stripe | pointer to previous cache line in the RAID stripe |
| l_slp_ptr | sleep pointer - used when operation must wait for acquire operation to complete before this one can continue (optional field) |
| dataAddr | data address - points to where the host data is actually stored in one of the data caches (optional) field) |
| seq_num_low | sequence number low - used for multiple active controller data copy operation |
| seq_num_hi | sequence number high - used for multiple active controller data copy operation |
| cld_type | used to keep track of the state a cache line is in for use during failover/failback and cache flushes |
| copy_index | index into free_copy_table |
| prev_copy_index | previous index into free_copy_table |
| free_copy_table | used to keep track of which copy cache lines (cld_type CM_CLD_COPY) this controller can write data into its partner controller's memory, and indicates which cache lines are currently is use and which cache lines are available to write new data into. |

Table A of the Additional Pseudo Code Examples set out hereinafter provides an illustrative example of pseudo-code for a cache line descriptor data structure implementation according to one embodiment of the invention.

Cache Line Bootup Allocation

Bootup here refers to the process of powering on the hardware platform and the steps taken by the firmware as a means to initialize its operating environment. During every bootup sequence, the firmware will load itself into the controller store (memory) from which it will execute. The firmware will also initialize all of its data structures, such as cache pools, hash tables, and CLD structures used to maintain the cache pools. In addition the firmware will initialize all processes that will receive host requests (writes, reads, and the like) and carry out the completion of those requests. A cache line bootup allocation procedure is provided because the allocation of the cache lines under the invention is different from the conventional allocation in that we now have two (or more) pools of potentially available or allocatable cache lines from which cache lines can be selected for allocation.

In one embodiment of the invention, the cache lines are allocated on the basis of some predefine rules or formula, for example, based on the amount of available free memory after all of the application data structures have been allocated. Application data structures are all of the firmware data structures that are required for firmware execution. These data structures include, but are not limited to: queues, scheduler data structures, hardware encapsulation data structures, environmental processes, and the like. (These structures are mentioned only out of an abundance of caution so that the reader understands that they require a portion of the memory available to the processor.)

In one embodiment of a dual-active system, about seventy percent (70%) of the cache lines are allocated to the primary cache, while about thirty-percent (30%) are reserved as mirror lines, where the mirror lines are used to hold a backup copy of write data for a partner controller. A partner controller is a controller that is active and working in tandem with this controller. The cache lines kept in the XOR engines cache 210 are considered in the primary cache, while the cache lines in the application processor's memory 204 are considered in the local cache. The thirty-percent reserve is typically found to be adequate, but there is a broad range of acceptable reserve, for example, anywhere from about 20 percent to about 50 percent would be acceptable. (The mirror cache lines are used when a controller fails to be able to write the write-back data the partner accepted from the host. After a fail over, the mirror cache lines are incorporated into the normal pool of cache lines.)

In the inventive split (or dual) cache embodiment, all of the cache line descriptors are allocated from the application processors memory 104. In the hierarchical cache embodiment, it is possible that some of the cache line descriptors are kept in a remote location. In the event of cache information in various places, the query about what is in the cache will be done through a messaging procedure and protocol. This hierarchical messaging procedure and protocol is described hereinafter in greater detail.

For the split cache, two LRU lists are kept for the available free cache lines. The "LRU" list stands for the "least recently used" list. This is a procedure for recycling cache lines based on which cache line has not been accessed recently. The goal of the procedure is to keep in cache, that data which is most often requested by the host, in the hope that it will be readily available. For the split cache, all of the cache lines which have valid data are kept on a single hash table. This is different from the hierarchical cache in which each cache has its own hash table.

Hash Tables

Figure 6:
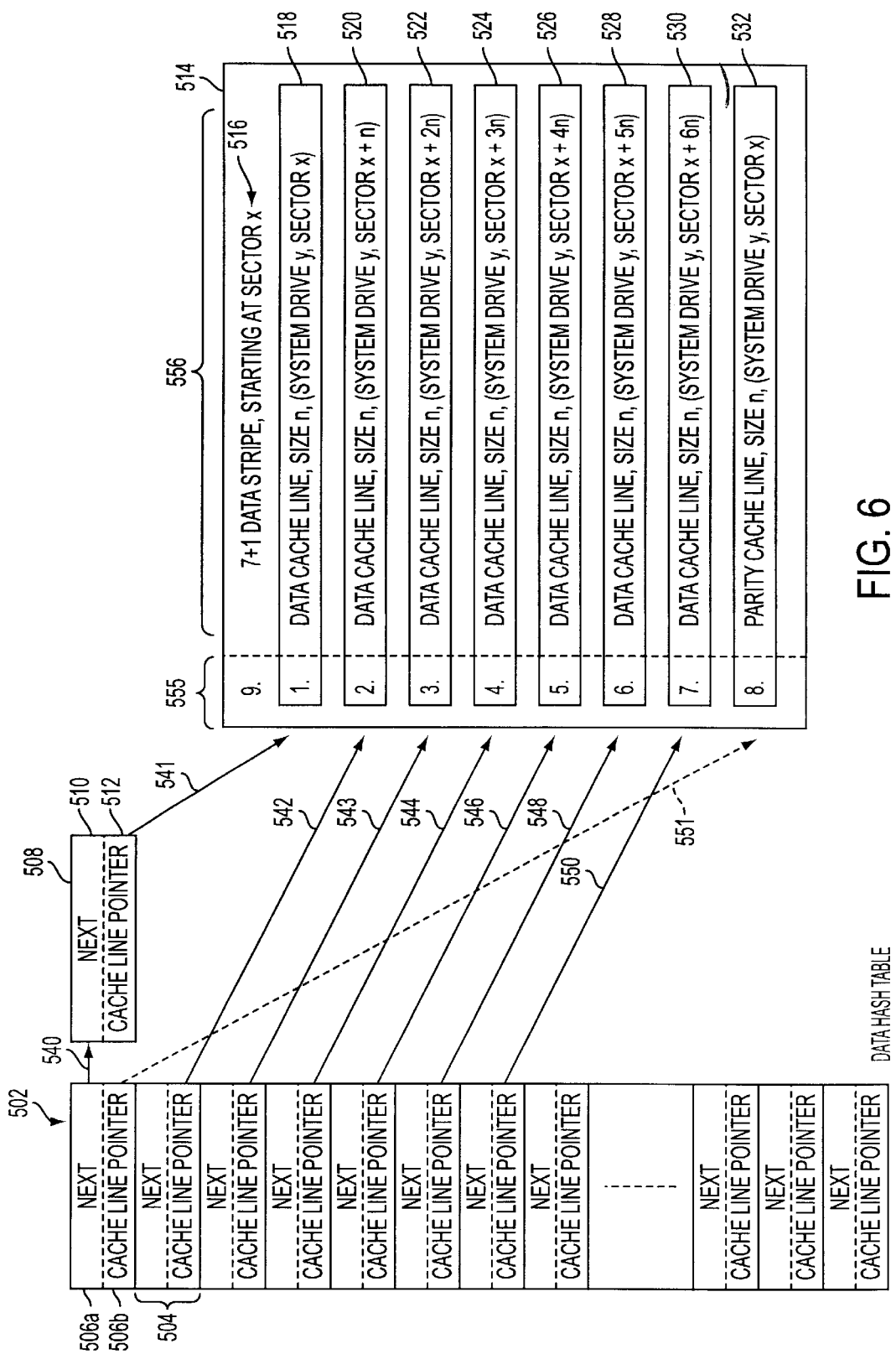
FIG. 6 is a diagrammatic illustration showing an exemplary embodiment of a Hash Table.

The inventive multiple level cache advantageously utilizes an additional hash table (referred to as a stripe hash table), beyond what is normally used in conventional configurations, to allow for quick lookup of cached data. FIG. 6 illustrates the structure of a conventional data hash table 502 in association with cache 514 and its operation for pointing to various cache data for all of the cache lines making up a RAID stripe in a 7+1 group. Conventional data hash table 502 includes a plurality of storage locations 504, each storing a "next" value 506*a* and a "cache line pointer" 506*b*.

A hash table allows the cache control firmware to perform a quick lookup to determine if host data is already cached by performing a quick hash table lookup based on the host request sector address on a system drive. To perform a cache lookup requires only an index and one linear search, which is reasonably quick if the hash table is a well chosen size. Hash table is constructed of an array of link list elements, which are the base nodes, with data elements hung off the base nodes through a linked list.

We now describe some further aspects of the hash table elements. The hash table itself is an array of N elements. N can be any value but is normally tuned to provide the best possible tradeoff between the fewest number of collisions using the smallest amount of memory. Each hash table array index stores cache elements based on their hash key. The hash key in one embodiment of the invention is determined using the data sector. A collision occurs for every cache line that has the same starting sector, but a unique system drive value. A collision also occurs for all sectors that map to the same hash key value. At each hash key value a cache line may be stored. A value of zero for any hash key value indicates no hash entries for that hash key. Each cache line stored at a hash key location may also contain a link to another cache line. For every collision, multiple cache lines are stored at the same hash key value, and each one is linked to the next so that all cache lines may be referenced from the same hash key value. For this reason, a linear search is provided for each hash table lookup after the hash key value is calculated. Only one element can be checked in each linear search pass, and since the elements are not ordered, the list must be searched in its entirety until the element is found or the end of the list is reached. In some instances it may be necessary to perform multiple searches through the hash table to determine if any elements from a RAID stripe are already present.

Cache lines are added to a conventional Hash table by calculating the cache line's hash key based on its sector number. Once the hash key is calculated, the cache line is added to the hash table array using the hash key value as an array index. If the hash key already has a cache line stored at that location, the new cache line is added to the link list. Hash table searches are performed by calculating a hash key value and then performing a linear search through all hash entries stored at that hash key value. The linear search traverses the link list of hash entries starting with the first cache line stored at that hash key value index. Each cache line stored in the hash table at that hash key index is compared with the desired System Drive, Sector, and Cache Line Type (data, parity, and the like). A match of all of these values indicates that a cache line does exit in the hash table, thus indicating a cache hit. Hash table entries are removed from the hash table by removing the cache line from the link list for that hash table key entry.

Figure 7:
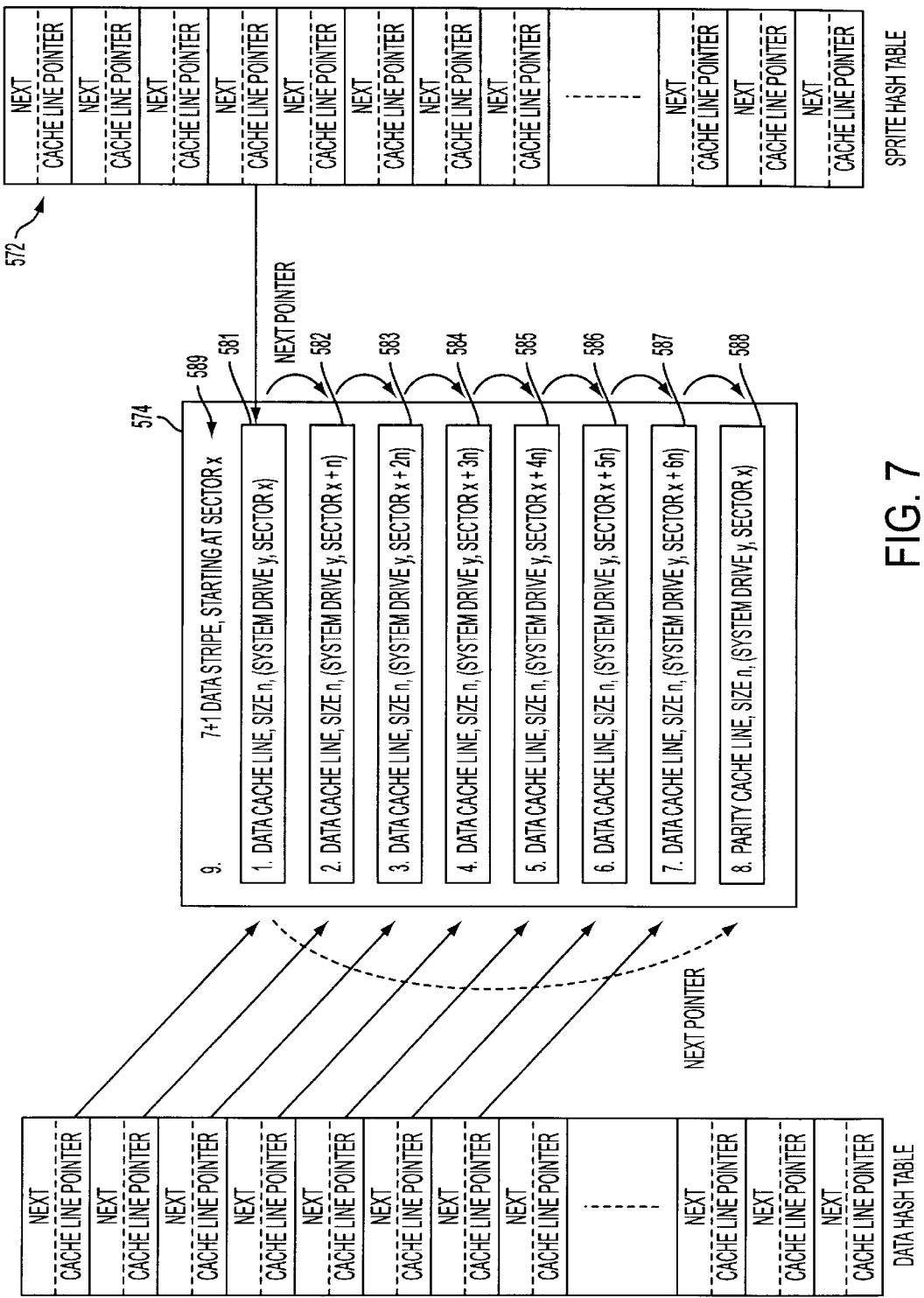
FIG. 7 is a diagrammatic illustration showing an exemplary embodiment of Data and Stripe Hash Tables.

By comparison, in the inventive structure and method, a stripe hash table 572 is provided in addition to the conventional hash table 502 to minimize the time required to determine from which cache (for example, from the primary cache or the secondary cache in the system of FIG. 3) a new cache line should be allocated. FIG. 7 shows how the two hash tables, data hash table 502 and stripe hash table 572, interact with cache 574 storing cache lines in a RAID 5 stripe. All of the cache lines 581—589 in the stripe are linked together from the same base node in the stripe hash table 572, whereas all cache lines except the first cache line and the parity cache line are linked off of different base nodes in the data hash table 502. The base node is the first cache line stored in the hash table array at the hash key index. The data hash table and stripe hash table parameters are summarized in Tables III and IV, and exemplary procedures for determining or identifying which base nodes to work off of are described relative to the has table parameters.

A cache line resides on two hash tables if it is a RAID 3 or RAID 5 cache line. All cache lines are kept on the standard hash table, an example of which is shown in FIG. 6. The standard hash table allows an I/O operation to quickly determine if the information it requires is available in the cache or if it must be obtained from disk. RAID 3 and RAID 5 cache lines must also be kept on the stripe hash table to allow for rapid determination of where an XOR operation can take place. To perform an XOR operation, all the cache lines need to be in a location where they can be easily accessed by a single XOR engine. The intent is to avoid having to copy the cache data from one cache to another cache to allow an XOR operation to take place.

Instead of sorting the cache lines simply by sector as in the standard or conventional hash table, the stripe hash table sorts cache lines by their group number. In one embodiment, the group number is calculated by taking the cache line's sector value and dividing it by the group size. For RAID 3 and RAID 5 groups, the group size is the number of disks in the RAID group minus one, multiplied by the cache line size. For example, a 7+1 RAID group, that is a group having 8 drives in the RAID group with one dedicated to parity in each group, with a cache line size of 32 K (a 32K cache line consists of 64,512 byte blocks), would have a group size of 448 blocks.

To determine which hash index a cache line is to be added to, the group number is ANDed by the stripe hash table size. This gives an index in the range from 0 to (N–1), where N is the number of hash entries in the stripe hash table. When an I/O operation needs to obtain a cache line to perform its work, it first checks the standard hash table to determine if the cache line is already present, if so, it uses the already available one. In the event the required cache line is not already present in the system, the I/O operation needs to check if any of its siblings are present in the system. To do this the stripe hash table is used. It computes the group number and the hash index to determine where the stripe hash table search needs to begin. The search is done by checking all cache lines off the base node to determine if any are from the same group number and system drive. If there is a match, the new cache line is allocated from the same cache that its siblings were allocated from. If there is not a match, the cache line can be allocated from any available cache. The actual allocation of new cache lines is based upon resource availability and load distribution.

either host or parity data; (iv) unlocking a cache line, this releases it back to the LRU list for potential reuse; (v) locking a cache line to prevent it from been reused or being released; and (vi) setting a cache line's operational state based on the data in the cache line and the operation it is needed for.

While the above six operations are implemented in a preferred embodiment of the invention, in fact, only the LRU manipulation routines and the allocation routine are modified to accommodate the split cache architecture. The adding and moving cache line from the LRU list is needed in certain embodiments of the invention since which particular LRU list the cache line resides on is based on which cache (either the primary cache or the local cache) it is part of.

The allocation routine first checks which RAID level the system drive is configured as. If the system drive is anything but RAID 3 or RAID 5, for example RAID 1, RAID 0, RAID 10, the cache allocation is simply based upon: (i) cache line availability for the two caches, and (ii) which

TABLE III

Summary of Data Hash Table Parameters

| | |
|---|---|
| DATA HASH TABLE | An array of Hash Table Size of pointers to CLD data structures. |
| BTRKSIZ | number of blocks in the cache line (16 blocks for an 8K cache line) |
| HASHMASK | number of entries in the data hash table minus 1. (number of entries is advantageously a power of 2) |
| sector | sector which the data transfer starts on |
| hash_key | index used to determine the base node of the data hash table. |
| hash_key | The Hash Key is a calculated value based on the sector value. In one embodiment of the invention, the Hash Key calculation provides an index value from 0 to Hash Table Size minus 1. |

TABLE IV

Summary of Stripe Hash Table Parameters

| | |
|---|---|
| STRIPE HASH TABLE | The Stripe Hash Table is an array of Stripe Table Size of pointers to CLD data structures. |
| system_drive | an internal representation of the SCSI logic unit. |
| RaidNumberOfSiblings (system_drive) | returns the number of data drives in a RAID 5 stripe. (For a 5 + 1 configuration, equals 6.) |
| group_size | size in blocks of the RAID 5 data stripe (For 8 K cache line in the 5 + 1 configuration, this equals 80 blocks = [RaidNumberOfSiblings(system_drive) − 1] × BTRKSIZ, where BTRKSIZ is a Data Hash Table parameter for the number of blocks in the cache line. |
| stripe_number | absolute stripe index on the system drive. (If the system drive is broken into pieces across the drives, this would be the stripe the data sector falls into.) |
| STRIPE_HASH_SIZE | number of entries in the stipe hash table. It must be a power of 2. |
| hashIndex | index used to determine the base node of the stripe hash table for particular data sector = stripe_number 'AND' (STRIPE_HASH_SIZE-1) |

Cache Line Runtime Allocation Procedure for Split Cache Embodiment

Different embodiments of the cache line run time allocation are used for the split or distributed cache embodiment and the hierarchical cache embodiment. We now describe the split-cache cache line run time allocation procedure. In the split cache embodiment for the exemplary architecture illustrated in FIG. 2. There are a series of operations which are used to allocate and check for the availability and presence of cache lines. These operations include: (i) searching for a specific piece of either host or parity data in the data hash table; (ii) searching for specific piece of either host or parity data in the cache and removing the cache line from the LRU list; (iii) allocating a new cache line to hold a piece of cache a line was last allocated from. The goal is to try to split the memory controllers load between the two caches. This, though a useful representation for purposes of describing the inventive structure and method, may not an entirely accurate representation of what would happen in an actual implementation where the primary cache might typically be significantly larger than the local cache so that the primary cache might be expected to receive a proportionally larger portion of the data traffic than the local cache.

The allocation routine for RAID 3 and RAID 5 cache allocation follows a more complex procedure. It is in this function that the stripe hash table 572 plays a part (see item 503 in FIG. 8) to determine which cache level the cache line needs to be allocated from. Sibling relationships are identified in the stripe hash table 572. If there are no sibling cache lines already allocated, the next step is to check if the XOR processor is fully utilized (see item 504 in FIG. 8). This check is made to help distribute the processor workflow between the two processors. If the XOR engine is not backed up (i.e., fully utilized), it is more effective to use the application processor 202 to bring data in from the host or to write data to the back-end disk, rather than to perform XOR operations itself. The rest of the tests identified in the FIG. 8 flow chart are to determine if cache lines are actually available in the cache from which the algorithm determined is most effective. The external XOR engines utilized in Mylex controller designs execute a scripting language which is used to instruct them as to what data to XOR together and where to place the result. Since a single XOR operation can be performed at any one time, multiple XOR scripts can be awaiting execution by the XOR engine. The application code keeps track of the number of outstanding XOR operations of all of the XOR processors. If another XOR engine in the system does not have a large amount of pending work to perform, the system will attempt to move data into the caches in order to allow the unloaded XOR engine to be used.

Figure 8:
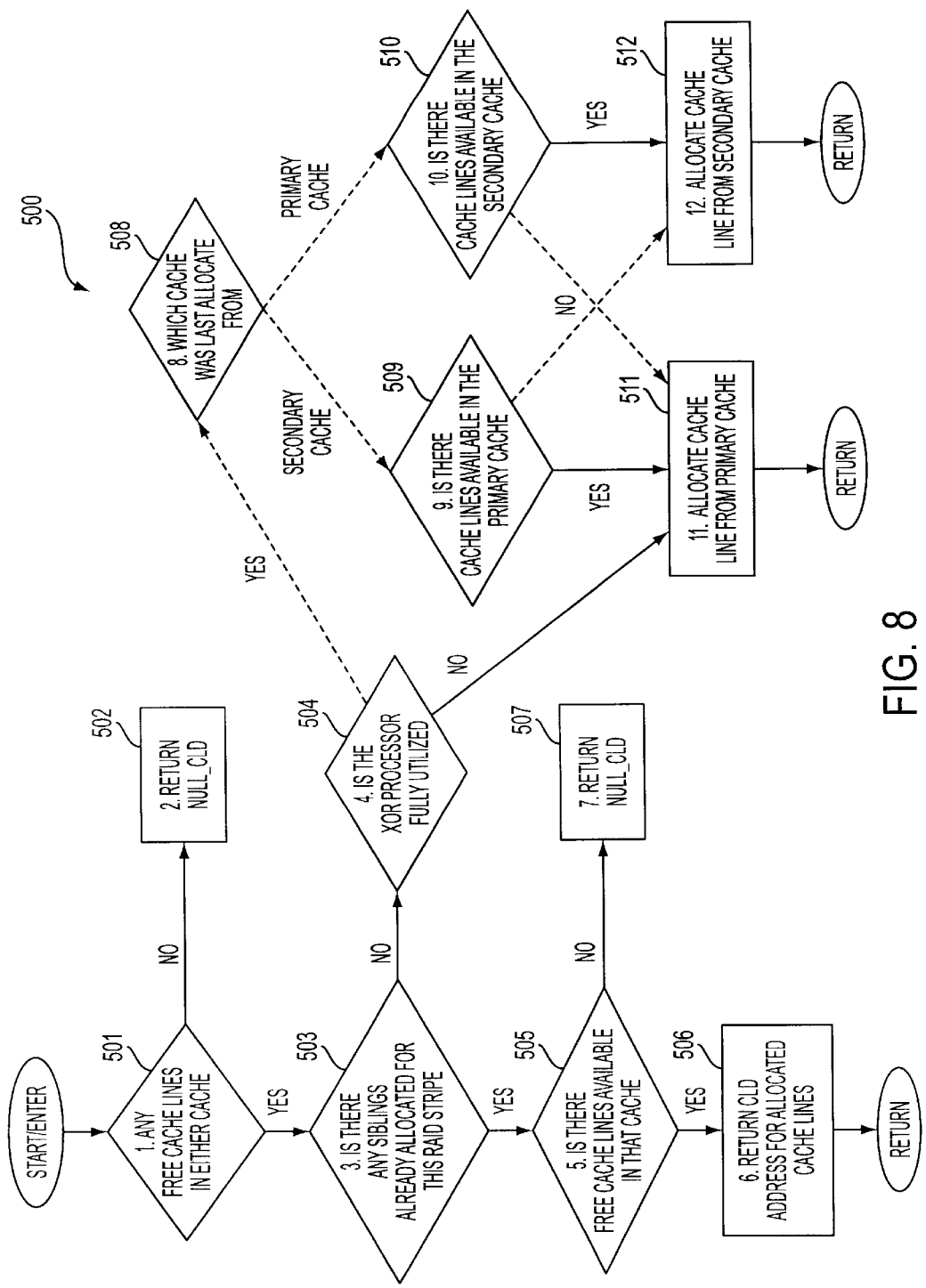
FIG. 8 is a diagrammatic flow-chart illustration showing an exemplary embodiment of a RAID Level 5 Cache Line Allocation procedure.

We now describe an exemplary RAID 5 cache line allocation procedure 500 relative to the flowchart diagram in FIG. 8. This method is performed each time cache lines are allocated for host requests. In Step 501 we determine whether there are any free cache lines in the either the primary or secondary cache. If the result of the test is no, then perform Step 502 and return "NULL_CLD" indicating that no cache lines are available. The host request must wait until cache lines are available. This request is placed on a pending queue for later processing.

If the result of the first test (Step 501) is yes, we perform Steps 503 to determine whether there are any siblings already allocated for this RAID stripe. If the result of this test (Step 503) is yes then perform Step 505 making the determination as to whether there are free cache lines available in the same cache used for the identified siblings. If there is free cache in the same cache used for the siblings, then the procedure returns the Cache Line Descriptor (CLD) address for the allocated cache line in that cache (Step 506. But, if there are no free cache lines available in the same cache as the siblings, then perform Step 507 and again return the result "NULL_CLD". This signifies that the system must wait before allocating memory for the host I/O operation. This is required so that the siblings are all managed from the same cache for the purposes of the XOR operation.

On the other hand, if when performing the Step 503 test to determine whether there are any sibling cache lines already allocated for this RAID stripe, the result is no, we instead perform Step 504 and determine whether the XOR processor is fully utilized. Full utilization of the XOR processor means that the XOR processor is currently executing an XOR operation and has at least one pending XOR operation queued up. The number of XOR operations which are queued up to an XOR engine to have it reach a fully utilized state is based upon the speed of the XOR engine and the host transfer speed. If the XOR engine is fast and the number of queued up XOR operations is insufficient, the XOR engine could potentially go idle before more XOR operations can be queued up by the Application Processor. For this reason, it is advantageous to set the threshold for full utilization high enough so that the XOR engine is never idle, and the Application Processor can perform XOR operations in the time it would normally be waiting for the XOR engine to complete its work.

If it is not fully utilized, we perform Step 511 and allocate the cache line from primary cache, and end the procedure 500. However, if the step of determining whether the XOR processor is fully utilized results in the yes determination, we perform Step 508 to identify which cache a cache line was last allocated from. If the last cache allocated from was the secondary cache, then perform Step 509 to further determined whether there are a cache and available in the primary cache. If there are cache lines available in the primary cache we allocate a cache line from the primary cache began as in Step 511; otherwise we allocate a cache line from secondary cache as in Step 512. On the other hand, if when performing step 508 to determine from which cache a cache line was last allocated, we find that the primary cache was last used, then we perform Step 510 to determine if there are cache lines available in the secondary cache, and if there are, we allocate a cache line from the secondary cache again as shown in Step 512, otherwise the perform Step 511 and allocate cache lines in the primary cache.

Additional XOR Engine for Split Cache Embodiment

The split cache requirement is to provide an XOR engine/processor which is available for each of the caches in which parity data will need to be generated. Again we provide different configurations for the XOR processor depending upon whether a split cache configuration or a hierarchical cache configuration are provided.

Another change needed to provide the split cache to work is to provide the application processor 202 with the capability to perform XOR operations in a second XOR engine 205. The determination which XOR engine 202 or 208 to use his based on the "type" field in the cache line descriptor. The advantage of the XOR processors 208 XOR operation is that it can take place without intervention by the application processor 202. For the application processor 202 to perform an XOR operation, it should not be performing the XOR operation in the time in which it would normally be idle. This, for example, includes when it is waiting for a disk operation to complete, or an XOR operation to complete.

Alterative Embodiment—Hierarchical Cache Architecture

In this section, we describe and alternative embodiment of the invention referred to as a hierarchical cache architecture and method. To discuss the various caches each will be assigned a "cache level" designation. The cache level designation has no direct relationship with "RAID level" designations mentioned elsewhere in this description. An exemplary hierarchical cache configuration in which multiple controllers have shared caches is illustrated in FIG. 9.

Figure 9:
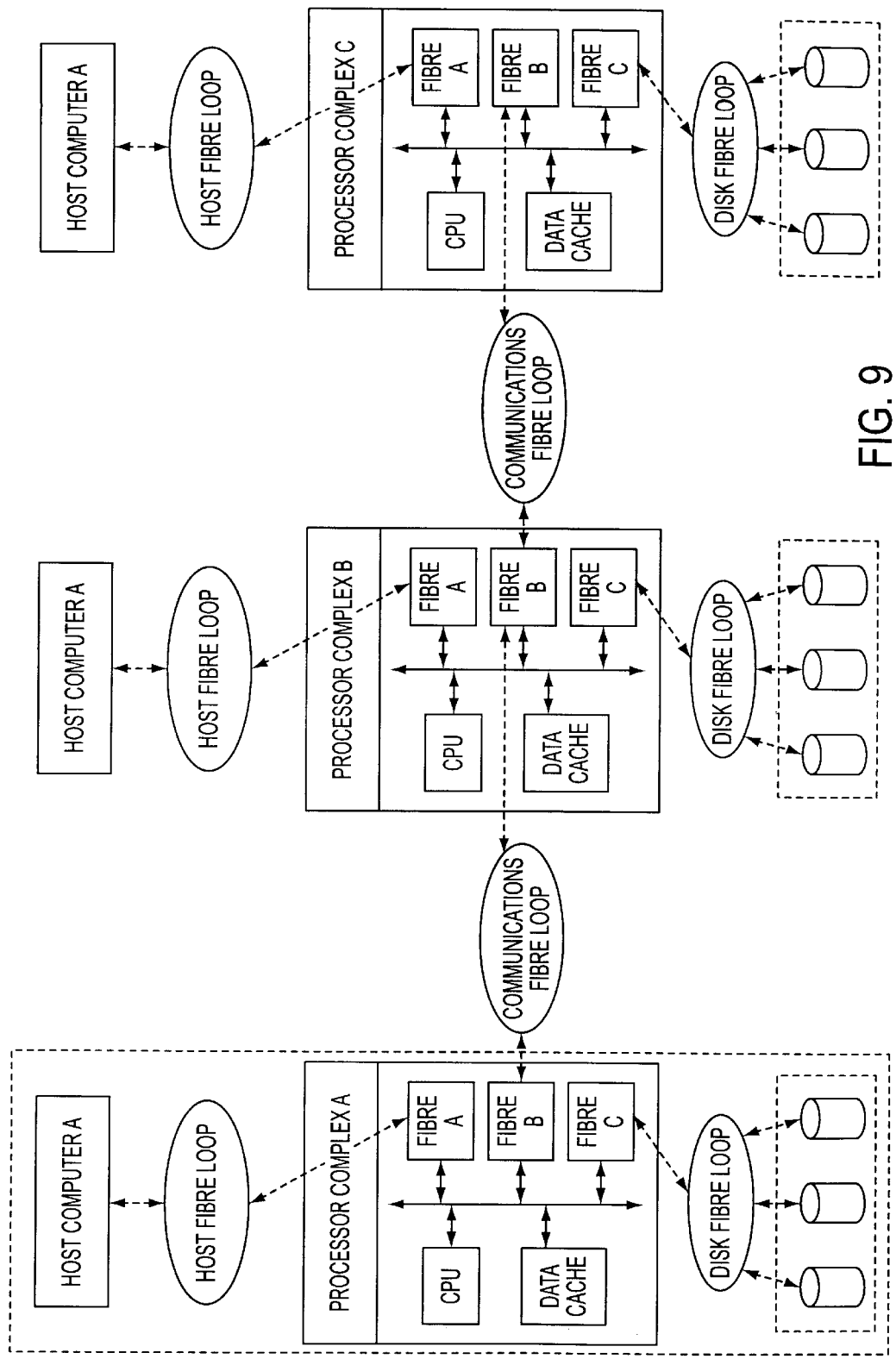
FIG. 9 is a diagrammatic illustration showing an exemplary hierarchical cache configuration in which multiple controllers have shared caches.

In the embodiment illustrated in FIG. 9, each controller has a local cache and has access to the data cached by the other controller. The caches are designed such that Host Computer A can access data which is stored in Controller C's data cache as one example. The difference between the caches has to do with locality to the host system which is requesting or sending the data and the amount of time the I/O operation takes to fully complete.

For the purposes of this description, the various caches are referred to as various levels from the point of view of (or relative to) a particular controller. The "level 0" cache is considered the first level of interaction with host operations. Data is moved to and from the level 0 cache to the host computer system. The level 0 cache is also the fastest temporary storage medium available to the storage controller. The level 1 cache is a second fastest temporary storage medium, it could be an alternate controller, or a solid-state disk, or the like. Further cache levels, for example, level 2, level 3, . . . , level n, indicate that longer access time and a slower path to reach the host system with the requested or received data.

Figure 10:
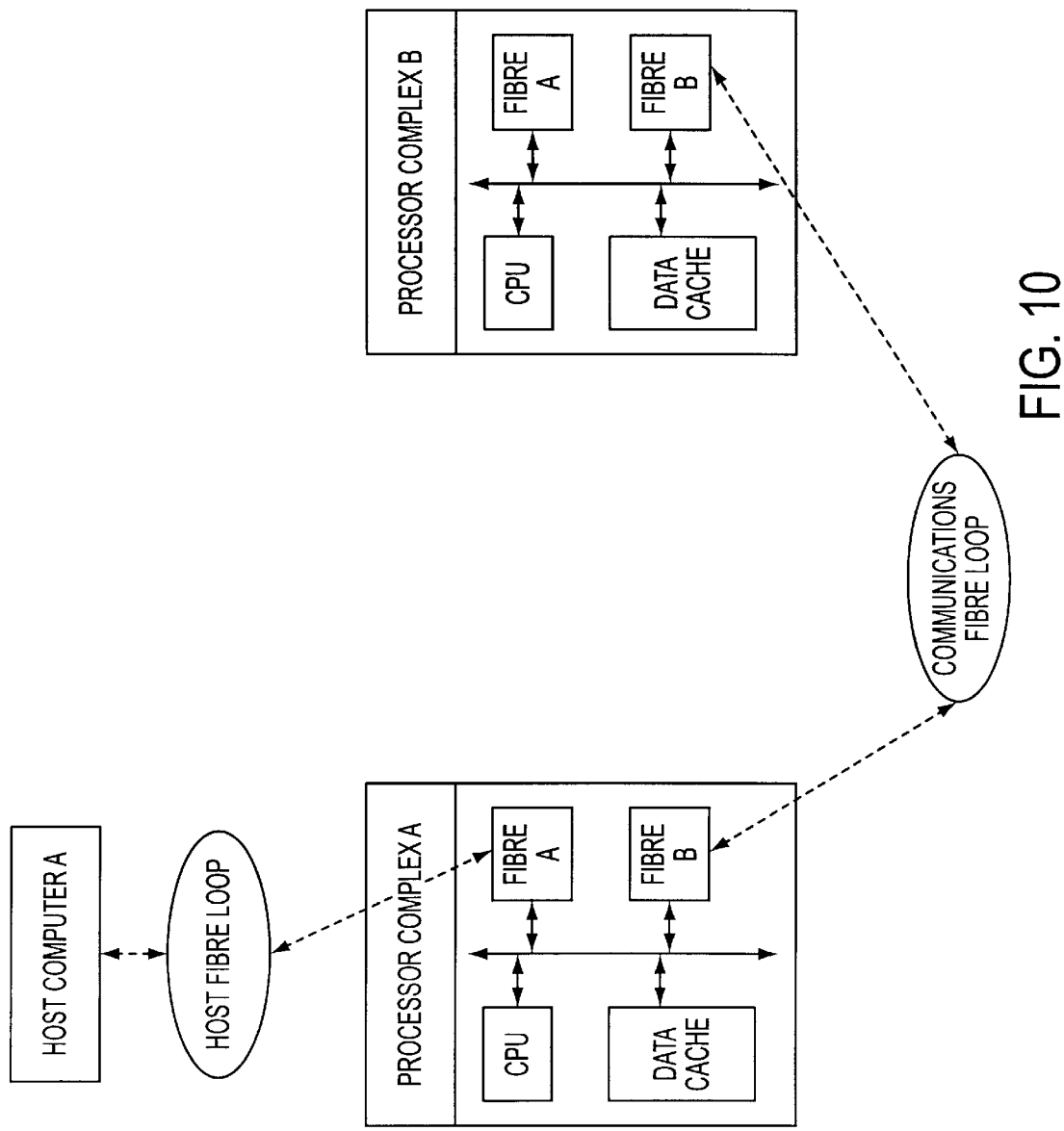
FIG. 10 is an illustration showing an embodiment of the invention in which each controller is a peer of each other controller and where as a result each has a level 0 cache from their own perspectives.

Data which exists in the level 1 cache may be able to be sent directly to a host, depending on the cache level topology. In general, data from the host should not be sent directly to the level 1 cache due to the longer response time to move data into the cache. Most cache level topologies require data to be staged between the various levels to move data around. With a few exceptions, it is often not possible to move data from a level 1 cache directly to the host. An example of a case in which this is possible would be as shown in FIG. 10. In this example, if the Fibre Chip B could act as a bridge to Fibre Chip A, the data could be transferred from the level 1 cache in controller B (level 1 from controller A's perspective) through Fibre Chip B to Fibre Chip A directly out to the Host Computer A. In general, the data would be transferred from Controller B's cache to Controller A's cache and then out to Host Computer A.

One issue raised in providing a hierarchically structured cache is keeping track of the available data and where it is located. This can be done through either a single multiple level hash table or multiple hash tables kept on separate cache control devices. The easier technique is to keep the hash tables co-resident with the cache owner's control processor. This eliminates the need to keep multiple hash tables coherent across multiple application processors. A single multiple level hash table is ideal for a system architecture which is based upon a shared memory architecture. In other words, all controllers have a common view of memory, thus when one controller changes a memory location, the change is seen by all controllers in the system. In a share nothing system, which is the architectural model used by some controllers (such as for example some controllers made by Mylex Corporation of Fremont, California) when one controller changes a piece of information which is needed by all controllers, it must explicitly inform the other controllers of the change. For at least this reason it makes sense to use a distributed hash table model. To inquire about the status of various caches, messages are used to communicate between them. To determine if data available for an operation, multiple checks are required.

The first hash table lookup is to determine data which is readily available in level 0 cache. In the event of a host read, the table which contain data which can be immediately transferred from the level 0 cache back to the host. For writes, this might be the data which would be used in a parity calculation, so would be data which can be read by the XOR engine.

The second level hash lookup is for data which can be brought from any remote cache in a single operation. In order to determine the most efficient place to access the data from, the hash table maintains an expected transfer time from each remote cache. Thus, when the same data exists in multiple places, a decision can be made as to where to obtain the data can be based on the time required to transfer the data from remote cache to the local cache.

Figure 11:
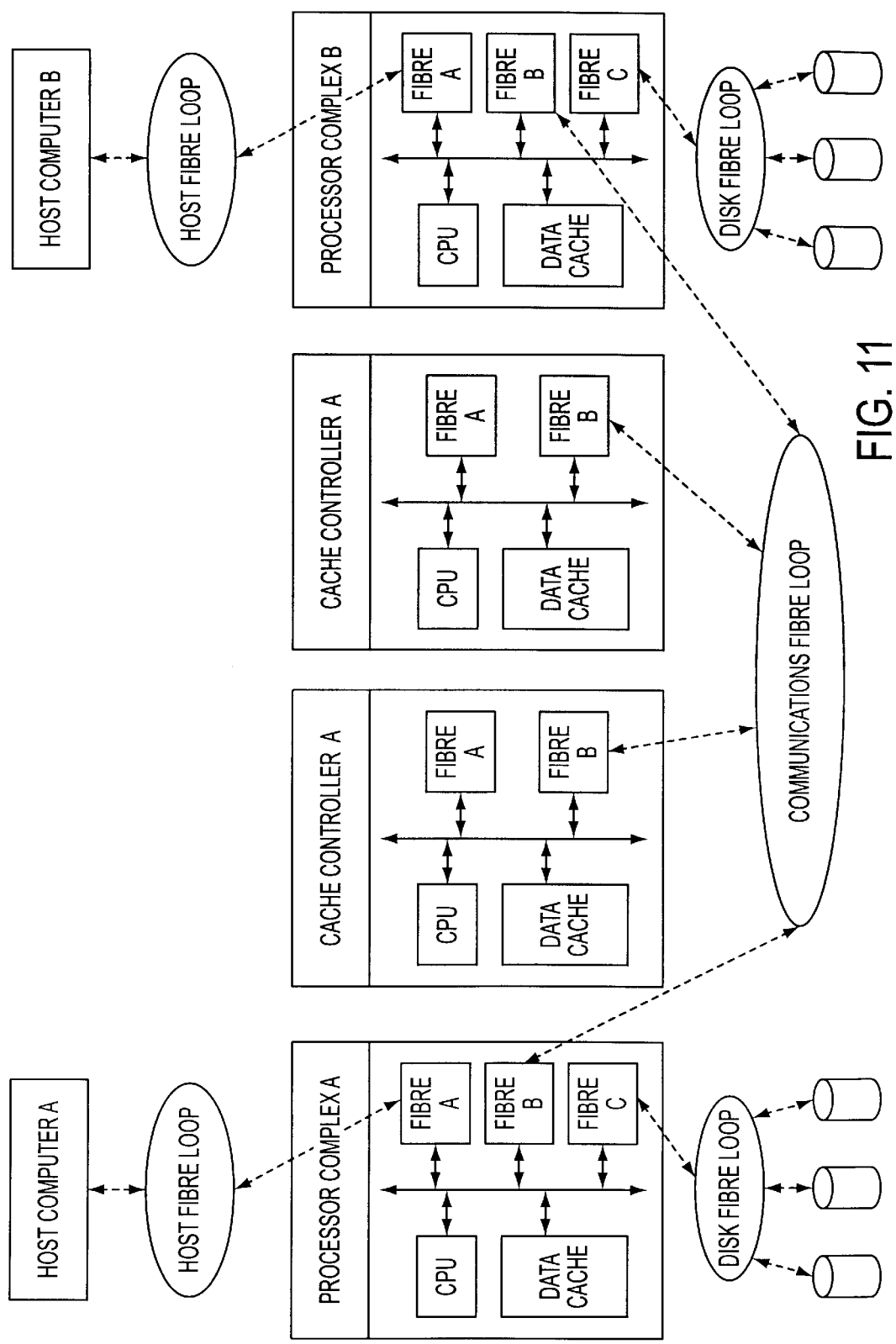
FIG. 11 is an illustration showing an embodiment of the invention in which there are two host controllers and two cache controller and where as a result the host controllers each own a level 0 cache, while the caches managed by the cache controllers are level 1 caches from the host controller's perspective.

In order to keep the data consistent in the multiple caches, the controllers in the system must communicate with each other when moving data to and from or invalidating data in the cache except the level 0 cache. The assumption is that data in any cache other than the level 0 cache is considered shared data, but that level 0 cached data is not shared. There are certain exceptions to this general rule, such as in a controller in which a single processor is responsible for maintaining split level 0 caches. In this case, there is no requirement to communicate changes in either cache, since one cache manager handles both caches. In the architecture illustrated in FIG. 11, each controller is considered a peer of the others, thus all have a level 0 cache from their perspective. In this architecture, there is no concept of a shared cache. FIG. 11 shows an exemplary architecture in which there are two host controllers and two cache controllers. In this case, the host controllers each own a level 0 cache, while the caches managed by the cache controllers are level 1 caches from the host controller's perspective.

The next issue associated with a hierarchical cache is where to place the data when it is brought in from either the host or from a disk drive. If data needs to be read from disk to perform a parity calculation, there is no reason to put it into level 0 cache memory if a higher level cache memory can be used perform the XOR calculation. This suggests that the cache fill algorithms be programmable based upon the type of operations which are being performed and the type of data which is being allocated. Various cache fill algorithms are known in the art and not described here in detail.

The list of operation types include, read data, write data, and parity data. When implemented in this manner, the allocation routines would be intelligent enough to always allocate the parity data from the memory which is used for the XOR operation. Furthermore, if multiple XOR engines are available in the system, the memory allocation routines would then allocate the parity data in the same memory as the host stripe data. The allocation routines would use a priority scheme for allocation. An example of one such priority based routine would be for example, as follows: (i) for parity data: allocate first from level 0 cache then from secondary cache; (ii) for read data: allocate first level 0 cache then from secondary (remote) cache; and (ii) for write data: allocate first the secondary cache then from level 0 cache. This exemplary priority based allocation procedure is designed to optimize the parity generation calculations and also take advantage of all memories in the system.

Another issue pertains to automatic promotion and demotion of data from each level of caching. This feature also would have a set of algorithms which are used depending upon the data being operated on. One exemplary embodiment for a dual-active architecture uses several different rules depending on if the write data is going to write-through or write-back system disk drive. (Write-through refers to a cache architecture in which data is written to main memory at the same time it is cached whereas write-back refers to a cache architecture in which data is only written to main memory when it is forced out of the cache.) All read data goes through the standard promotion to level 0 cache upon a read. With hierarchical cache, write data could be demoted through multiple levels, the first being the level 1 cache followed by a faster write to a RAID 1 protected drive (which could be a level 2 cache), and finally to a RAID 5 volume or tape as a backup storage (which would be considered the level 3 cache for purposes of this description as it is slower than the other caches described heretofore). Each host visible system drive could have its own set of caching algorithms depending upon how the data is to be used.

The additional XOR engine and the cache line runtime allocation procedure are the same in the hierarchical embodiment as in the split cache embodiment already described. The description is therefore not repeated here.

Messaging Protocol for Hierarchical Cache

For hierarchical caches, a messaging procedure and protocol is provided to permit the caches to communicate with each other. For the purpose of this description, is assumed that each hierarchical cache has its own processor to manage the data. (A split cache may have different levels of response, but all the pieces are controlled by a single processor.) The messages for that reason are actually addressed to a processor complex. A processor complex consists of a processor which is able to receive and send messages to other processor complexes and at a minimum an associated data cache. A processor complex may also have host computer and disk storage connections, in addition to other features.

To control the various caches, cache control firmware located in the processor complex is provided to perform a minimum of several cache control and manipulation operations, including: (i) determining if a piece of data exists one of the remote caches; (ii) moving a piece of data from a higher level (remote) cache to the lower level (local) cache, where here, the lower level cache (generally level 0) is the one owned by the processor which is performing the query or sending the message, and the higher level cache is owned by the processor for which the message is designated (data promotion); (iii) move a piece of data from a lower level cache to a higher level cache (data demotion); (iv) invalidate data in the higher level cache; and (v) unlock a piece of data in a higher level cache. These operations are performed through the use of four messages, the Cache Query Message, Cache a Promotion Message, Cache Data Demotion Message, and Cache Data Unlock Message, each of which are described in greater detail in the sections immediately below.

The Cache Query Message is used to inquire as to whether a piece of data exists in remote cache. The valid responses are, DATA_PRESENT, DATA_NOT_PRESENT, and DATA_ARRIVING. A data handling field (referred to as the "command" field in the data structure) is used instruct the remote cache what to do with data if data is present. The valid commands are: DATA_REMOVE, DATA_LOCK, and DATA_NOP. The DATA_REMOVE command is used to invalidate a stale piece of cache data. The DATA_LOCK command, locks the piece of data into the cache until either a cache promotion or cache demotion message is received. The DATA_REMOVE message releases a lock on a piece of data. When a lock is released, it gives the controller which is managing the cache the opportunity to reuse a cache line if no other controller or process also is maintaining a lock on that cache line. Locks are used to keep track of the usage of a cache line. When the process requires that a cache line remain in the system while it is being used, it locks the cache line. When the process no longer requires the cache line, it unlocks it to allow it to potentially be reused. The Cache Query Message is a message sent between controllers, while the fields are commands to the receiving controller.

Table B of the Additional Pseudo Code Examples set out hereinafter is an illustrative example of pseudo-code showing how a cacheQueryMessage data structure might be defined to allow controllers to communicate the status of a piece of data in their respective caches. A controller could send this message to an alternate controller to query it as to the availability of a piece of cached data in the data caches it controls.

The Cache Data Promotion Message is used to bring data from a remote cache into a local cache. After the piece of data has been copied to the new cache, the receiver of the message may release the cache line or lines, unless the center all the message explicitly sets the keepLocked flag in the cache Promotion Message. Providing a flag is done to allow a remote cache to act as a slave cache for different processor.

The Cache Data Promotion Message (cacheDataMovementMessage) is used to request data be moved from a remote cache into a different cache. It assumes that when the request is made that the data exists in the source cache. If the data does not exist, an error condition will be returned to the destination controller (the controller which is making the request to have data moved into its cache). When this message completes successfully, a good status will be returned to the destination controller.

Table C of the Additional Pseudo Code Examples set out hereinafter illustrates an example of a message data structure which can be used to communicate the method of moving data from one controller's cache to another controller's cache.

The Cache Data Demotion Message (cacheDataMovementMessage) is used to move a piece of data into a remote cache. The Cache Data Demotion Message uses the same message structure as the cache data promotion message. The only difference is the command type which is sent down with the message packet. There can be two responses from this request, DATA_MOVED and DATA_NOT_MOVED. The DATA_NOT_MOVED response is reserved for when the remote cache does not have any free (or enough) cache lines to accept the data. It is the receiving processors responsibility to allocate space in its cache to accept data. The keepLockedflag is used to force the remote cache to retain the data until it is explicitly release by the only cache processor.

The Cache Data Unlock Message is used to release a cache line from the remote cache that is no longer needed. This is the converse operation to the demotion and promotion messages with the keepLocked flag set to TRUE. This message can also be used to invalidate a cache line in a remote cache. Table D of the Additional Pseudo Code Examples set out hereinafter is an illustration of an example of a message data structure which can be used by one controller to inform another that it is done operating on a cache line owned by the other controller. It will cause the controller which owns the cache line to decrement that cache lines used count by 1 count.

Figure 12:
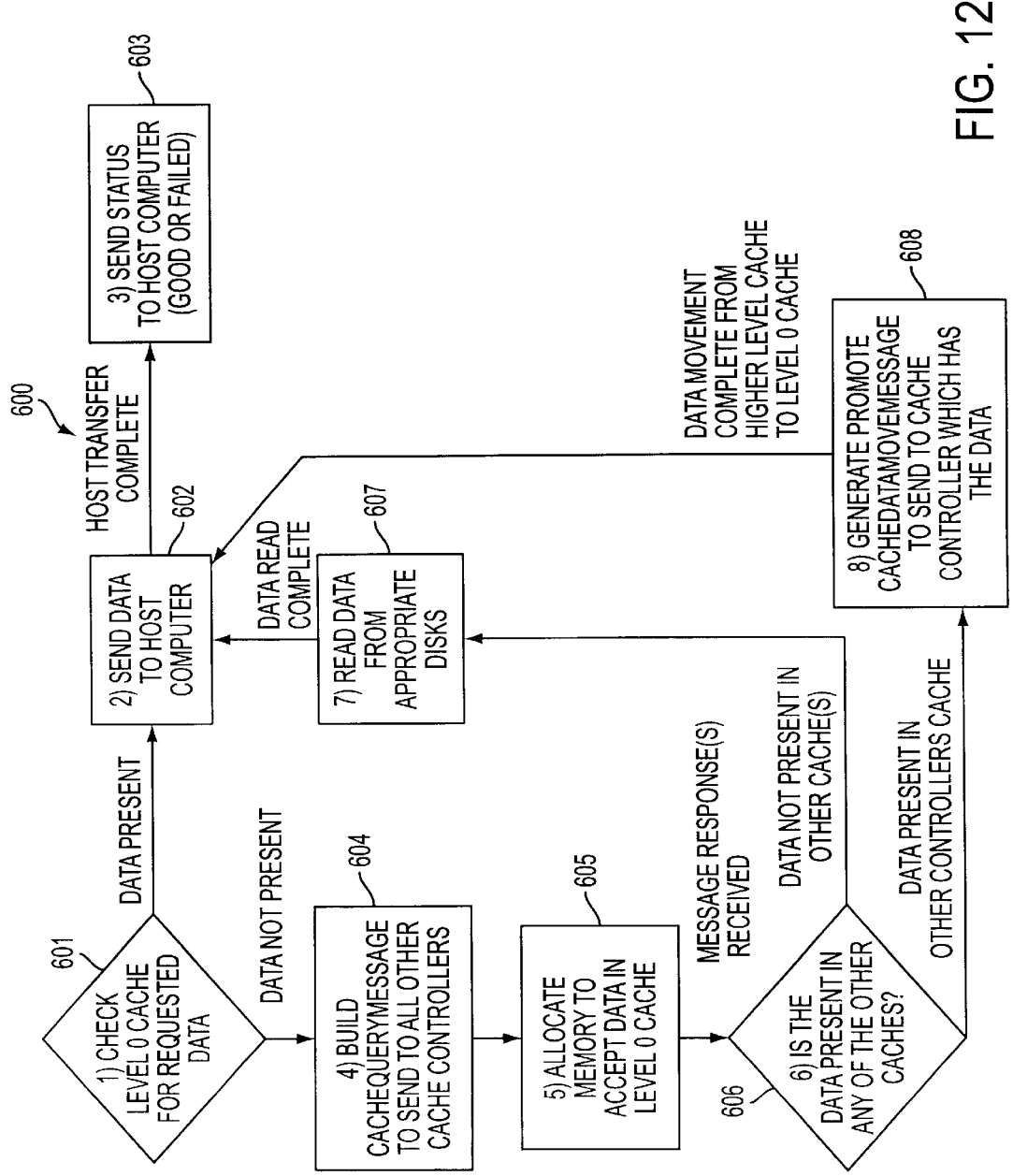
FIG. 12 is an illustration showing an embodiment of the inventive multi-level cache read procedure.
Figure 13:
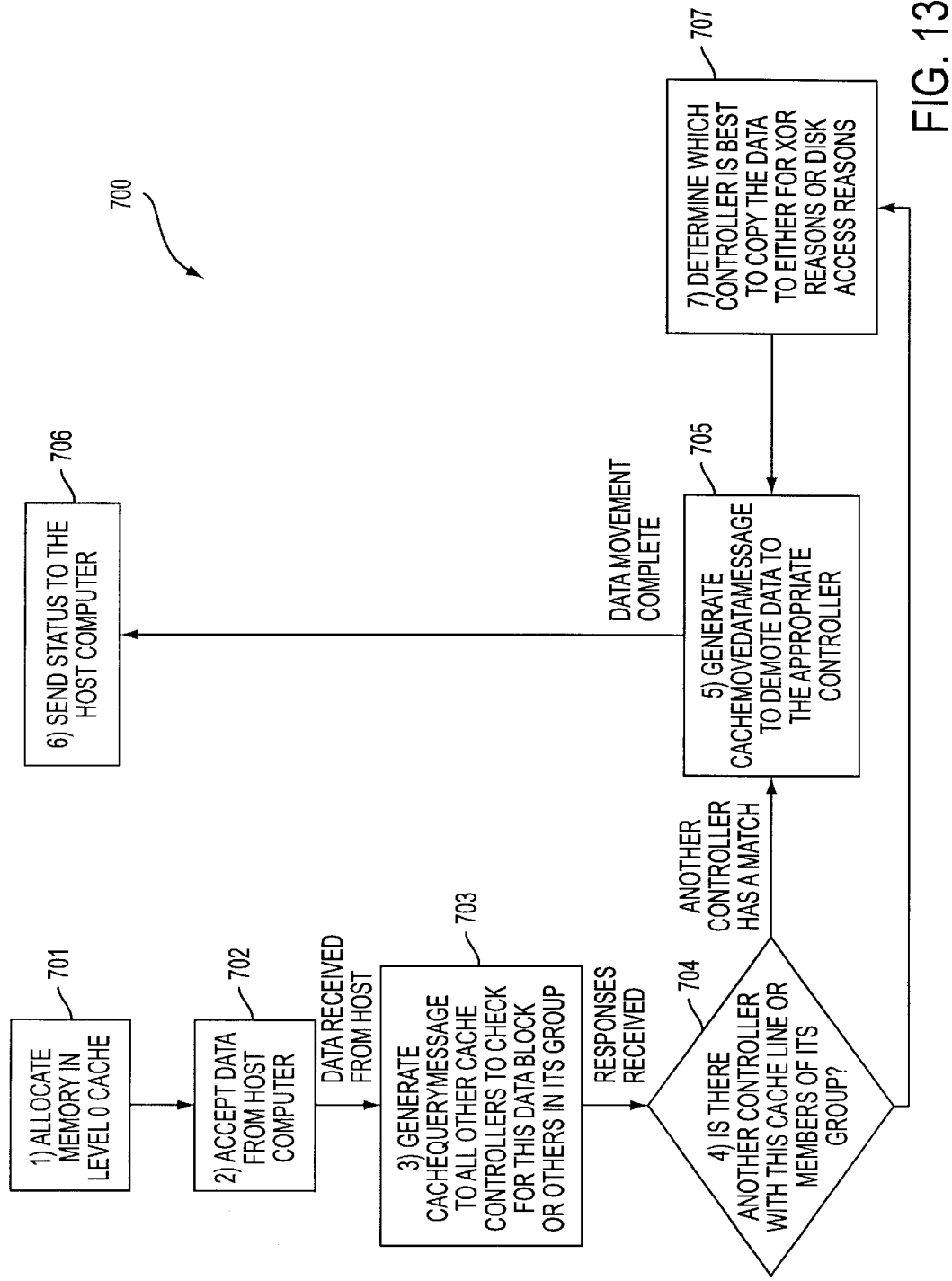
FIG. 13 is an illustration showing an embodiment of the inventive multi-level cache write procedure.

Exemplary multi-level cache read and multi-level cache write operations are now described relative to the diagrammatic flow-charts in FIG. 12 and FIG. 13 respectively. As described herein before, the controllers use messages to communicate information between each other. This is done to allow the processor complexes to operate as independent entities which share nothing directly. When a first controller needs a piece of data or information which may be held by another second controller, the first controller generates a message (sending controller) and transmits it to the second controller (receiving controller). Based on the type of message a controller receives it will perform some actions and then respond with status to the sending controller. It is possible to have multiple messages in various states of execution on multiple controllers in a system. This implies that there is no requirement that messages be interlocked, for example there is no requirement that one must complete execution before another may be started. Aspects of message passing are described in U.S. Provisional Patent Application Serial No. 60/088,200 entitled "Apparatus System and Method for N-Way RAID Controller Having Improved Performance and Fault Tolerance" which is hereby incorporated by reference.

An exemplary embodiment of a multi-level cache read procedure is now described relative to the diagrammatic flow-chart illustration in FIG. 12 which shows how a host read operation would be processed in a multi-level cache environment from the perspective of the controller which receives the host request. This particular embodiment assumes a system in which a data transfer cannot take place from a higher level cache directly to a host system and includes an optional step of allocating memory to accept data in level 0 cache. However, it should be understood that in the event the higher level cache could send data directly to the host computer, this procedural step would only need to be performed in the event the data had to be read directly from disk.

We now describe the multi-level cache read procedure 600 in greater detail. First, upon receipt of the host request, a determination or test is performed to check if the cache (level 0) which is owned by the controller which received the request contains the requested data (Step 601). If the data is present in the level 0 cache, the data is sent directly from the level 0 cache to the host system (Step 602). After the host data transfer takes place, if the transfer was successful, good status is sent to the host, but if the transfer failed to complete for any number of reasons, failed status is returned to the host. (Step 603).

If the a determination (Step 601) reveals that all or a portion of the requested data is not present in the level 0 cache, the other cache controllers in the system are queried (by building and sending a cacheQueryMessage to the other controllers as described below) to determine if data which is being requested is present in any of their caches before reading the data from the backing storage media (Step 604). An underlying assumption in this approach is that data can be transferred between controllers more quickly than it can be read from disk. To determine if any of the other cache controllers in the system have the data, the controller which received the host read request generates a cacheQueMessage for each other cache controller in the system. The cacheQueryMessage contains the information needed for the other controllers to determine if they hold the requested data. Each controller which receives the message will check its hash table to determine if the requested data is present. If it finds the data in its cache, it will lock the data into place and return a DATA_PRESENT status. If the data is not present in its cache, it will return a DATA_NOT_PRESENT status.

After sending queries to the other controllers (Step 604), memory is allocated in the level 0 cache to either receive data transferred from an alternate controller or data read in from the backing storage (Step 605). Then, responses to the query received from the other controllers are processed, and a determination is made as to whether none, some, or all of the requested data is present in a higher level cache (Step 606). If none of the requested data is present in a higher level cache, it is read in from the backing media, such as disk storage (Step 607) and when all of the data reads have been completed so that the data cached in the level 0 cache, the data is then sent to the host (Step 602). If all of the data is present in a higher level cache we initiate and complete data movement from a higher level cache to the level 0 cache by generating a cache data move message (cacheDataMoveMessage) to send to the cache controller which has the data (Step 608). If multiple caches have pieces of the data requested by the host, multiple messages of this type need to be generated and sent to the appropriate controller. When all of the data has been moved from the higher level cache(s) to the level 0 cache, the data is then sent to the host (Step 602). On the other hand, if some of the requested data is present in a higher level cache and some of the data is not, we must both read data not present in from the backing media (Step 607) and initiate and complete data movement of data from a higher level cache to the level 0 cache (Step 608), as already described.

We now describe the multi-level cache write procedure 700 in greater detail relative to the diagrammatic flow-chart in FIG. 13, which illustrates an embodiment of the procedure performed for a controller which receives a host write request in a multi-level cache environment.

After a host system generates a write request, space is allocated in memory to allow the data form the host to be moved into the level 0 cache (Step 701). After the memory has been allocated, the data is moved into the controller from the host system (Step 702). When the data movement is completed, a determination is made as to where the data is to finally reside (Steps 703–707). We describe this determination in greater detail.

Messaging between controllers is provided to allow one controller to inquire if any other controllers in the system may have data which is being requested by a host in their cache (Cache Query Messages). One other message is provided to allow movement of the data between the various caches within a system (Cache Data Move Message). First, the CacheQueryMessages are sent to all other cache controllers in the system to determine if any other cache controller is already working with the written data (for RAID 3 or RAID 5), or if any controller already has an older copy of the data in their cache (for other RAID levels) (Step 703). Responses to the CacheQueryMessage are received, and a determination is made as to whether the received data needs to be demoted to a higher level cache. If another controller is already working on the data stripe for RAID 3 or RAID 5, or has an older copy of the data we demoted the data to a higher level cache through the cacheDataMoveMessage which places the data into an alternate controller's data cache (Step 705). On the other hand, if no other controller owns or is working on the data we make a determination as to which controller it is appropriate to move the data to, either for XOR reasons or disk access reasons, according to predetermined rules (Step 707). The data is them moved as appropriate by demoting the data to a higher level cache through the cacheDataMoveMessage to place the data into an alternate controller's data cache (Step 705) (It is possible that, the controller which received the data is actually the most appropriate controller to cache the data, in which situation, the data is not moved.) Following the generation of the cache move data message, and appropriate movement of the data, status information is sent to the host computer (Step 706).

In describing this embodiment of the cache write procedure 700, we assume that the controllers are not required to perform cache copies to maintain data integrity in the event of a controller failure. If the cache copies are required for the purposes of redundancy, then other optional steps would be performed in which a data demotion would take place regardless of whether another controller was better suited to perform the XOR or better suited to write the data to disk.

By way of highlighting certain aspects of the invention, we note that the inventive structure and method provide a variety of features and advantages as compared to conventional structures and methods. By way of example, but not limitation, the invention provides several innovations including: (1) A method of achieving optimal data throughput by taking full advantage of multiple processing resources (either processors or controllers, or a combination of the two) in a system. (2) A method for managing the allocation of the data caches in such a way as to optimize the host access time and parity generation. (3) Cache allocation for RAID stripes is guaranteed to provide the fastest access times for the exclusive-OR (XOR) engine by guaranteeing that all cache lines are allocated from the same level of cache. (4) Allocation of cache lines for RAID levels which do not require parity generation are allocated in such manner as to maximize utilization of the memory bandwidth to the host interface. (5) Parity generation is optimized for the use of whichever processor is least utilized at the time the cache lines are allocated, thereby providing for dynamic load balancing amongst the multiple processing resources available in the system. (6) The inventive cache line descriptor includes enhancements over other conventional approaches to allow for maintaining information about which cache data pool the cache line resides within. (7) The inventive cache line descriptor includes enhancements to allow for movement of cache data from one cache level to another. (8) The inventive cache line descriptor includes enhancements to allow for tracking which RAID stripe cache lines siblings in which cache may reside within. These various features, advantages, and enhancements over conventional systems, devices, structures, and methods may be used alone or in combination. Other features and advantages will be apparent to those workers having ordinary skill in the art in conjunction with this description.

Table A shows an illustrative example of pseudo-code for a cache line descriptor data structure implementation according to one embodiment of the invention. Table B shows an illustrative example of how a cacheQueryMessage data structure might be defined to allow controllers to communicate the status of a piece of data in their respective caches. A controller could send this message to an alternate controller to query it as to the availability of a piece of cached data in the data caches it controls. Table C illustrates an example of a message data structure which can be used to communicate the method of moving data from one controller's cache to another controller's cache. Table D is an illustration of an example of a message data structure which can be used by one controller to inform another that it is done operating on a cache line owned by the other controller. It will cause the controller which owns the cache line to decrement that cache lines used count by 1 count.

TABLE A

Exemplary Cache Line Descriptor pseudo-code for a cache line descriptor data structure implementation according to one embodiment of the invention.

```
typedef struct _CLD_TYPE
{
    U8   1_valid; /* Valid byte indicator for SCSI copies */
/*
** super-read-ahead flag = sra_flag
** The super-read-ahead flag is used to instruct the application code
** about how a cache line was used in a read ahead operation and for
** keeping statistics about the read ahead performance.
** SRA_NOT_PREFETCHED - is set for normally obtained cache lines
** SRA_PREFETCHED_LINE - is set when a cache line is allocated for a
** read ahead operation
** SRA_HIT_ON_PREFETCH - is set when a read hit from the host occurs on
** a cache line that was read ahead
*/
    U8   sra_flag;
#define    SRA_NOT_PREFETCHED      0
#define    SRA_PREFETCHED_LINE     1
#define    SRA_HIT_ON_PREFETCH     2
/*
** cache type - type
** This is the field that tells the application code which cache the
** cache line was allocated from. It is set during boot time and not
** changed during runtime. In the current system there are two types of
** caches:
** PRIMARY_CLD - this is set for the cache lines which exist in the
** XOR processors cache memory.
** LOCAL_CLD - this is set for the cache lines which exist in the
** application processors control store memory.
*/
    U8   type;
#define    PRIMARY_CLD     0
#define    LOCAL_CLD       1
    U8   fili0(1);
/*
** copyComplete is a flag used to determine when cache line copies
** which are done by an external copy engine are completed. It is set
** to FALSE at the beginning of the copy operation, and when the
** operation completes, it is set to TRUE.
*/
    Boolean copyComplete;
/*
** 1_blk contains the information needed to keep track of what host
** data exists in the cache line. It tells the system drive, sector,
** the type of the cache line (DATA, PARITY, etc.), and the group
** number (which RAID stripe this cache line belongs to).
*/
    SYS_BLOCK 1 _blk;  /* start blk no for this trk (line) */
/*
** The following are counters used to keep track of how a cache line is
** being used.
*/
    U16  lock;  /* Lockcount       */
```

TABLE A-continued

Exemplary Cache Line Descriptor pseudo-code for a cache line descriptor data structure implementation according to one embodiment of the invention.

```
    U16   wrlock;   /* Write lock count    */
/*
** cache line status - 1__stat
** The cache line status indicates the following:
** VALID - the cache line is fully valid, all data is good.
** PART_VALID - some of the data in the cache line is valid.
** DIRTY - The cache line is fully dirty, all sectors need to be
** written to disk.
** WBK_QUEUED - The cache line is sitting on the write back queue,
    awaiting being written out to disk.
** GEN_ON - A write back operation has been started on this cache line.
** RX_SIT - A read operation has been initiated on this cache line.
** WX_SIT - A write operation has been initiated using this cache line.
*/
    u_char 1__stat;   /* VALID PART_VALID,DIRTY    */
    u_char fillI(3);
/*
** The following are counters used to keep track of how a cache line is
** being used.
    U16   1__used; /* User count     */
    U16   1__woken; /* no of woken up users   */
/*
** Valid Bit Map - 1__vbm
** The valid bit map keeps track of which sectors are valid in a cache
** line, i.e., the data in the cache line corresponds to the latest data
** written by the host.
*/
    u_short 1__vbm;   /* validity bit-map for line,bit-set
            for blk (bit-no + 1__blk) valid */
/*
** Dirty Bit Map - 1__dbm
** The dirty bit map indicates which sectors have been written to the
** cache line by the host, but have not yet been written to disk.
*/
    u_short 1__dbm;   /* dirty bit-map for line, same as above */
/*
** Hash Table Index - hsh__tb-indx
** The hash table index indicates which array entry this cache line is
** hung off of on the hash table, this is a computed value stored to
** reduce the number of times it needs to be recomputed.
*/
    U32   hsh__tb__indx; /* index of hash table */
    U32   cld__indx;   /* index of this entry in c__l__d |*/
/*
** Write Back Queued Time - time__stamp
** This is used to keep track of when a cache line was placed on the
** write back queue. It is used for the cache line aging algorithm to
** determine when it should be removed from the hash table and written
** to disk.
*/
    u_int  time__stamp; /* time stamp of when placed in wbk queue */
/*
** The following are pointers for placing a cache line on various queues:
** The LRU queue is for holding cache lines which are not dirty and can be
** reused by other operations.
** The hash table pointers are for placing a cache line on the hash table.
** The hash table allows for rapid lookup of data.
** The write back queue holds lines which are dirty and need to be written
** to disk.
** The stripe hash table is used to hold cache lines to allow for
** determining where other cache lines in a stripe need to be allocated.
*/
    struct _CLD_TYPE *1__nxt__1ru; /* pointer to next line in lru chain */
    struct _CLD_TYPE *1__prv__lru; /* pointer to prev line in lru chain */
    struct _CLD_TYPE *1__nxt__hash; /* pointer to next line in hash link */
    struct _CLD_TYPE *1__prv__hash; /* pointer to prev line in hash link */
    struct _CLD_TYPE *1__nxt__wbk; /* pointer to next line in wbk queue */
    struct _CLD_TYPE *1__prv__wbk; /* pointer to prev line in wbk queue */
    struct _CLD_TYPE *1__nxt__stripe;
    struct _CLD_TYPE *1__prv__stripe;
/*
** The sleep pointer is used when an operation must wait for a prior
** operation to complete before this one can continue.
*/
    SLPQ_TYPE *1__slp__ptr;   /* pointer to sleep q entry */
/*
```

TABLE A-continued

Exemplary Cache Line Descriptor pseudo-code for a cache line descriptor data structure implementation according to one embodiment of the invention.

```
** The sequence number - seq_num_low and seq_num hi
** The copy indexes - copy_index and prev_copy_index
** These fields are all used for multiple active controller data copy
** operations.
*/
    u-int seq_num_lo;   /* for MS, SX application, 64 bit */
    u_int seq_num_hi;   /* for MS, SX application, 64 bit */
    u_int cld_type;    /* SX: RW or COPY line */
    u_int copy_index;  /* Index into FREE_COPY_TABLE */
    u_int prev_copy_index; /* Previous index into FREE_COPY_TABLE */
/*
** Data Address - dataAddr
** The data address points to where the host data is actually stored in
** one of the data caches.
*/
    u_char *dataAddr;
} CLD_TYPE;   /* 28 words */
```

TABLE B

Example of how a cacheQueryMessage data structure may be defined to allow controllers to communicate the status of a piece of data in their respective caches.

```
Typedef struct
{
/*
** The sysBlock field is used to define the system drive,
** sector, and data type the cache lookup is for
*/
        SYS_BLOCK sys Block;
/*
** the command field is used to instruct the destination cache control
** processor what to do with a piece of data.
*/
        DATA_OPERATION command;
/*
** the time out fielder is used to allow a piece of data which is
** locked to be released in the event the timeout lapses. It is
** included as the safety measure. It is only applicable if the
** command is set to DATA_LOCK and a matching piece of data was found.
*/
        U32 timeout;
/*
the Lock Tag is a unique field which can be used to allow a quicker
** lookup for the cache promotion message. If the query command is
** sent with command set to DATA_LOCK and the lockTag is not set to 0,
** the tag will be remembered by the receiving controller and can be
** used by the requesting processor to quickly identify the block of
** data.
*/
        U32 lockTag;
} cacheQueryMessage;
```

TABLE C

Illustrates an example of a message data structure which can be used to communicate the method of moving data from one controller's cache to another controller's cache.

```
    Typedef struct
    {
    /*
    ** Command is used to tell if this message is being used to move data
    ** from one cache to another from the requesting controllers point of
    ** view, either a promotion, DATA_PROMOTION, or from the requesting
    ** controllers cache to another cache, data demotion, DATA_DEMOTION.
    */
    DATA_COMMAND COMMAND
    /*
    ** the sysBlock is used to allow the source controller (the controller
    ** who holds the data) to perform a search for the cache line in its
    ** cache. It is only used when the lockTag is set to 0.
```

TABLE C-continued

Illustrates an example of a message data structure which can be used to communicate the method of moving data from one controller's cache to another controller's cache.

```
*/
SYS_BLOCK sysBlock;
/*
** The lockTag field is a unique identifier which was passed to the
** source controller through a cacheQueryMessage. If it is set to 0,
** the sysBlock field is used to determine if a cache line is present.
*/
U32 lockTag;
/*
** The data location information is to tell the controller which
** currently holds the data where to move the data to in the
** destination controller for a data promotion command or where to
** move the data from in a data demotion message.
*/
void *dataAddress;
U32 byteCount;
/*
** The keepLockedFlag is used to tell the source controller to not
** release the lock after the data has been moved to the new
** destination. If this flag is not set, the source controller
** automatically decrements the lock count on the cache line.
*/
Boolean keepLockedFlag;
} cacheDataMovementMessage;
```

TABLE D

Example of a Message Data Structure

```
Typedef struct
{
/*
** The sysBlock is used to allow the controller who holds the data to
** perform a search for the cache line in its cache. It is only used
** when the lockTag is set to 0.
*/
SYS_BLOCK sysBlock;
/*
** The lockTag field is a unique identifier which was passed to the
** controller which owns the cached data through a cacheQueryMessage.
** If it is set to 0, the sysBlock field is used to determine if a
** cache line is present.
*/
U32 lockTag;
} cacheUnlockMessage;
```

We Claim:

1. In a computer I/O processing system having a plurality of processing resources, a method of optimizing data throughput to achieve maximum memory bandwidth, the method comprising steps of:

(a) providing a data cache in each of said plurality of processing resources configured to store the data;

(b) processing the data in parallel among at least some of said plurality of processing resources and corresponding data caches;

(c) tracking the data within the plurality of processing resources and the data caches; and (d) communicating between and among the plurality of processing resources when moving data to and from any of the data caches and invalidating data in any of the data caches, except a system level (primary) cache, to keep the data consistent in the data caches.

2. The method of claim 1, wherein the plurality of processing resources are selected from the group consisting of multiple processors, multiple controllers, and a combination of multiple processors and multiple controllers.

3. The method of claim 1, wherein each said cache includes a plurality of cache lines, and step (b) further includes steps of:

(b)(i) allocating data to a cache line in said at least some of said plurality of cache lines;

(b)(ii) searching each of the data caches for a particular cache line; and (b)(iii) performing parity generation operations to encode and decode the data.

4. The method of claim 3, further including steps of:

(b)(iv) accepting data from a host system;

(b)(v) reading data from a system drive; and (b)(vi) writing data to the system drive.

5. The method of claim 1, wherein processing the data in parallel excludes processing data stored or retrieved from RAID stripes which are processed in parallel by a SCSI input/output processor in conjunction with a cache system, where the SCSI input/output processor reads data blocks and parity from the disk subsystem into cache.

6. The method of claim 1, wherein the step of processing the data in parallel among at least some of said plurality of processing resources and corresponding data caches excludes processing of a SCSI Chip.

7. The method of claim 1, wherein the step of processing the data in parallel among at least some of said plurality of processing resources and corresponding data caches excludes processing of a RAID disk subsystem.

8. The method of claim 1, wherein the step of processing the data in parallel among at least some of said plurality of processing resources and corresponding data caches utilizes a plurality of data paths.

9. The method of claim 1, wherein the step of communicating between and among the plurality of processing resources and data caches utilizes a plurality of data paths.

10. The method of claim 1, wherein the plurality of processing resources are selected from the group consisting of multiple processors, multiple controllers, and a combination of multiple processors and multiple controllers, such that the combination of multiple processors and multiple controllers does not include a SCSI chip.

11. The method of claim 1, wherein each said cache includes a plurality of cache lines, and step (b) further includes steps of:
- (b)(i) allocating data to a cache line in said at least some of said plurality of cache lines;
- (b)(ii) searching each of the data caches for a particular cache line, such that the data caches does not include data caches of a SCSI chip; and
- (b)(iii) performing parity generation operations to encode and decode the data.

12. The method of claim 1, wherein the plurality of processing resources are coupled with a plurality of data paths among at least some of said plurality of processing resources.

13. The method of claim 1, wherein the processing the data in parallel among at least some of said plurality of processing resources and corresponding data caches is in addition to any processing performed by SCSI chip or processing performed by a RAID Disk Subsystem.

14. The method of claim 1, wherein the processing the data in parallel among at least some of said plurality of processing resources and corresponding data caches excludes SCSI input/output processor.

15. The method of claim 1, wherein the tracking the data in parallel among at least some of said plurality of processing resources and corresponding data caches utilizes a multiple level hash table.

16. The method of claim 1, wherein the communicating between and among the plurality of processing resources when moving data to and from any of the data caches and invalidating data in any of the data caches, except a system level (primary) cache, to keep the data consistent in the data caches is in addition to any processing performed by SCSI chip or processing performed by a RAID Disk Subsystem.

17. In a computer I/O processing system having a plurality of processing resources, a method of managing an allocation of data caches to optimize host access to the plurality of processing resources and parity generation for optimization of data throughput to achieve maximum memory bandwidth, the method comprising steps of:
- (a) performing a first table lookup operation to identify data contained in a system level (primary) cache;
- (b) performing a second table lookup operation to identify data that can be brought from a secondary cache in a single I/O operation;
- (c) allocating caches for the data in order to optimize parity generation; and
- (d) automatically promoting and demoting the data from one cache level to another in response to a read/write operation.

18. The method of claim 17, wherein the plurality of processing resources are selected from the group consisting of multiple processors, multiple controllers, and a combination of multiple processors and multiple controllers.

19. The method of managing the allocation of data caches in claim 17, wherein the data comprises a RAID stripe to provide fast access time for the computer I/O processing system, the method further comprising a step of:
- (e) allocating all cache lines from the same cache level so that parity data and associated write data are maintained at the same cache level.

20. The method of claim 17, wherein step (c) further includes steps of:
- (c)(i) determining an RAID level of a system drive;
- (c)(ii) when the RAID level is RAID level 3 or RAID level 5, determining if any of the cache lines which form the RAID stripe (sibling cache lines) are allocated and the data cache of allocation; and
- (c)(ii) querying a stripe hash table data structure to determine if the data is already contained within any of the data caches based on a host sector address on the system drive.

21. The method of claim 20, further including steps of:
- (c)(iv) searching for a segment of the data in a data hash table;
- (c)(v) searching for the segment of the data in the data cache;
- (c)(vi) removing the cache line from a least recently used (LRU) list;
- (c)(vii) allocating a new cache line to hold the segment of the data;
- (c)(viii) unlocking a cache line, to release the cache line;
- (c)(ix) adding the cache line to the LRU list for reuse;
- (c)(x) locking a cache line to prevent it from been reused or being released; and
- (c)(ix) setting an operational state for a cache line based on the data in the cache line and the operation performed on the cache line.

22. The method of claim 21, wherein the plurality of processing resources are selected from the group consisting: of multiple processors, multiple controllers, or a combination of multiple processors and multiple controllers; and parity generation is optimized to use a select one of the plurality processing resources which is least utilized at the time the cache lines are allocated for dynamic load balancing amongst the plurality of processing resources of the system.

23. The method of claim 17, wherein the cache lines for RAID levels do not require parity generation and the cache lines are allocated to maximize memory bandwidth to a host interface, step (c) further including steps of:
- (c)(i) determining cache line availability for a split-cache; and
- (c)(ii) determining which cache line was last allocated.

24. A cache line descriptor (CLD) data structure embodied in a computer readable medium in a computer system I/O processing system, wherein the CLD data structure maintains information for identification of a cache data pool in which a cache line resides, the data structure comprised of:
- a system drive field indicating the system drive where data is read/written;
- a sector field indicating a starting sector of the data on the system drive;
- a number of blocks field indicating a size of a host read request;
- a cache level field for storing an integer value of the cache level of each data stripe;
- a next least recently used (LRU) link field and a previous LRU link field for maintaining a linked list of pointers to a next line in a LRU chain and a previous line in the LRU chain to handle reuse of a cache line that is not in use;
- a next hash link field and a previous hash link field for maintaining a linked list of pointers to a next line in a hash link and a previous line in a hash link to enable finding a cache line based on a system drive and a sector number; and
- a next stripe link field and a previous stripe link field for maintaining a linked list of pointers to all cache lines that are part of a RAID stripe.

25. The data structure of claim 24, wherein the CLD data structure allows movement of cache data from one cache level to another by a tracking the writing of the host data to disk and updating the cache level field, and also tracking the generation of parity for the RAID stripe that the cache line is part of, the data structure further including:
- an XOR engine field for storing a value identifying an XOR engine that performs the parity calculation for data moved to another cache level; and
- a copy complete field for storing an indicator used to indicate a start of a direct memory access (DMA) operation and a completion of the DMA operation when a copy is required to another data cache.

26. The data structure of claim 24, wherein the CLD data structure tracks the cache lines that form the RAID stripe (cache line siblings) and the data cache the cache line siblings reside within, such that the system drive field, the sector field and the number of blocks field are set to an invalid value and the next stripe link field and the previous stripe link field are set to zero to indicate that the cache line is no longer part of the RAID stripe.

27. An apparatus for processing input/output transactions in a computer system to increase data throughput and memory bandwidth, said apparatus comprising:
- a plurality of processing resources and a data cache in each of said plurality of processing resources configured to store data, said processing resources and data caches being coupled for communication to move said data between said processing resources and data caches;
- tracking and control logic processing the data in parallel among at least some of said plurality of processing resources and corresponding data caches and maintaining information as to the location of data within the plurality of processing resources and the data caches;
- communication means for moving said data between and among any of the data caches; and
- data validation logic for validating and invalidating data in any of the data caches, except a system level cache, to keep the data consistent in the data caches.

28. The apparatus of claim 27, wherein the plurality of processing resources are selected from the group consisting of multiple processors, multiple controllers, and a combination of multiple processors and multiple controllers.

29. The apparatus of claim 27, wherein each said cache includes a plurality of cache lines, and said processing resources and data caches are adapted for allocating data to a cache line in said at least some of said plurality of cache lines; searching each of the data caches for a particular cache line; and performing parity generation operations to encode and decode the data.

30. The apparatus of claim 29, wherein and said processing resources and data caches are further adapted for accepting data from a host system; reading data from a system drive; and writing data to the system drive.

31. The apparatus of claim 30, further comprising means for managing allocation of data caches to optimize host access to the plurality of processing resources and parity generation for optimization of data throughput to achieve maximum memory bandwidth.

32. The apparatus of claim 27, wherein the plurality of processing resources excludes a SCSI chip.

33. The apparatus of claim 27, wherein the plurality of processing resources excludes processing of a RAID disk subsystem.

34. The apparatus of claim 27, wherein the plurality of processing resources are coupled with a plurality of data paths.

35. The apparatus of claim 17, wherein the plurality of processing resources excludes SCSI I/O processors (SIOP).

36. The apparatus of claim 27, wherein the plurality of processing resources are selected from the group consisting of multiple processors, multiple controllers, and a combination of multiple processors and multiple controllers such that the combination of multiple processors and multiple controllers does not include a SCSI chip.

37. An apparatus for processing input/output transactions in a computer system to increase data throughput and memory bandwidth, said apparatus comprising:
- a plurality of processing resources and a data cache in each of said plurality of processing resources configured to store data, said processing resources and data caches being coupled for communication to move said data between said processing resources and data caches;
- tracking and control logic processing the data in parallel among at least some of said plurality of processing resources and corresponding data caches and maintaining information as to the location of data within the plurality of processing resources and the data caches;
- communication means for moving said data between and among any of the data caches;
- data validation logic for validating and invalidating data in any of the data caches, except a system level cache, to keep the data consistent in the data caches;
- wherein each said cache includes a plurality of cache lines, and said processing resources and data caches are adapted for allocating data to a cache line in said at least some of said plurality of cache lines; searching each of the data caches for a particular cache line; and performing parity generation operations to encode and decode the data;
- wherein and said processing resources and data caches are further adapted for accepting data from a host system; reading data from a system drive; and writing data to the system drive;
- further comprising means for managing allocation of data caches to optimize host access to the plurality of processing resources and parity generation for optimization of data throughput to achieve maximum memory bandwidth;
- first and second look-up tables, said first table operative to identify data contained in a system level cache, and said second table lookup operative to identify data that can be brought from a secondary cache in a single I/O operation; and
- a cache allocation manager allocating caches for the data in order to optimize parity generation, and automatically promoting and demoting the data from one cache level to another in response to a read/write operation.

38. The apparatus of claim 37, wherein the plurality of processing resources are selected from the group consisting of multiple processors, multiple controllers, and a combination of multiple processors and multiple controllers.

39. The apparatus of claim 37, wherein the data comprises a RAID stripe to provide fast access time for the computer I/O processing system, and said cache allocation manager allocating all cache lines from the same cache level so that parity data and associated write data are maintained at the same cache level.

40. The apparatus of claim 37, wherein said cache allocation manager being operable to determining an RAID level of a system drive, and when the RAID level is RAID level 3 or RAID level 5, determining if any of the cache lines which form the RAID stripe are allocated and the data cache of allocation, and querying a stripe hash table data structure to determine if the data is already contained within any of the data caches based on a host sector address on the system drive.

41. A computer program product for use in conjunction with a computer system, the computer program product comprising a computer readable storage medium and a computer program mechanism embedded therein, the computer program mechanism, comprising:

a program module that directs the computer system or components thereof, to function in a specified manner to improve data throughput to achieve improved memory bandwidth, the program module including instructions for:
defining a data cache in each of said plurality of processing resources configured to store the data;
processing the data in parallel among at least some of said plurality of processing resources and corresponding data caches;
tracking the data within the plurality of processing resources and the data caches; and
communicating between and among the plurality of processing resources when moving data to and from any of the data caches and invalidating data in any of the data caches, except a system level cache, to keep the data consistent in the data caches.

42. The computer program product of claim 41, wherein the instructions for tracking the data utilizes a multiple level hash table.

43. The computer program product of claim 41, wherein the program module includes instructions for communicating between and among the plurality of processing resources being coupled with a plurality of data paths.

44. A computer program product for use in conjunction with a computer system, the computer program product comprising a computer readable storage medium and a computer program mechanism embedded therein, the computer program mechanism, comprising:

a program module that directs the computer system or components thereof, to function in a specified manner to manage an allocation of data caches to improve host access to a plurality of processing resources and parity generation for improving data throughput to achieve maximum memory bandwidth, the program module including instructions for:
performing a first table lookup operation to identify data contained in a system level cache;
performing a second table lookup operation to identify data that can be brought from a secondary cache in a single I/O operation;
allocating caches for the data in order to optimize parity generation; and
automatically promoting and demoting the data from one cache level to another in response to a read/write operation.

* * * * *